United States Patent
Copley et al.

(10) Patent No.: US 7,824,775 B2
(45) Date of Patent: Nov. 2, 2010

(54) AUTOGENOUSLY WELDED METALLIC CELLULAR STRUCTURES AND METHODS FOR FORMING SUCH STRUCTURES

(75) Inventors: Stephen M. Copley, State College, PA (US); William G. Rhoads, Bellefonte, PA (US); Chris A. Sills, State College, PA (US); Eduard S. Ventsel, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 1171 days.

(21) Appl. No.: 11/455,446

(22) Filed: Jun. 19, 2006

(65) Prior Publication Data

US 2009/0324987 A1     Dec. 31, 2009

Related U.S. Application Data

(60) Provisional application No. 60/692,321, filed on Jun. 20, 2005, provisional application No. 60/702,351, filed on Jul. 25, 2005.

(51) Int. Cl.
- B32B 7/04 (2006.01)
- B32B 7/08 (2006.01)
- B32B 15/00 (2006.01)
- B23K 26/10 (2006.01)

(52) U.S. Cl. ............ 428/593; 428/594; 228/181; 228/175; 219/121.14; 219/121.64

(58) Field of Classification Search ............ None
See application file for complete search history.

(56) References Cited

U.S. PATENT DOCUMENTS

| 4,254,188 A | | 3/1981 | Campbell et al. |
| 4,689,870 A | | 9/1987 | Mieyal |
| 5,635,306 A | | 6/1997 | Minamida et al. |
| 5,723,225 A | * | 3/1998 | Yasui et al. ............... 428/593 |
| 5,994,666 A | * | 11/1999 | Buldhaupt et al. ...... 219/121.64 |
| 6,138,898 A | * | 10/2000 | Will et al. .................. 228/157 |

(Continued)

OTHER PUBLICATIONS

Sypeck, D.J. and H.N.G. Wadley. Cellular Metal Truss Core Sandwich Structures. Advanced Engineering Materials 2002, 4, No. 10. pp. 759-764.

(Continued)

*Primary Examiner*—Jennifer C McNeil
*Assistant Examiner*—Jason L Savage
(74) *Attorney, Agent, or Firm*—Gifford, Krass, Sprinkle, Anderson & Citkowski, P.C.; Douglas L. Wathen

(57) ABSTRACT

An autogenously welded structure is provided that includes a first face sheet, a plurality of individual stiffener elements, and a second face sheet. The stiffener elements each have a first edge disposed against the first face sheet and an opposed second edge. Each stiffener element has a central portion extending between the opposed edges. The central portion is disposed at an angle to the first face sheet. The stiffener elements include at least some stiffener elements that are disposed at an angle to at least some of the other stiffener elements. The second face sheet is disposed against the second edges of the stiffener elements and the first and second face sheets are autogenously welded to the edges of the stiffener elements.

24 Claims, 19 Drawing Sheets

U.S. PATENT DOCUMENTS

| | | |
|---|---|---|
| 6,412,251 B1 | 7/2002 | Early |
| 6,419,146 B1 * | 7/2002 | Buldhaupt et al. .......... 228/193 |
| 6,508,394 B1 * | 1/2003 | Buldhaupt et al. .......... 228/157 |
| 6,826,996 B2 | 12/2004 | Strait |
| 6,848,233 B1 | 2/2005 | Haszler et al. |
| 2003/0049482 A1 * | 3/2003 | Buldhaupt et al. .......... 428/593 |
| 2005/0233128 A1 | 10/2005 | Joseph et al. |

OTHER PUBLICATIONS

Wadley, Hadyn. Cellular Metals Manufacturing. Advanced Engineering Materials 2002, 4, No. 10. pp. 726-733.

Evans, A.G., J.W. Hutchinson, N. A. Fleck, M.F. Ashby, H.N.G. Wadley. The topological design of multifunctional cellular metals. Progress in Materials Science, 46 (2001). pp. 309-327.

McGill Corporation. Product Data Sheet. Aug. 1993. www.mcgillcorp.com.

Hexcel. Honeycomb: HexWeb Honeycombs for Aerospace and Industry. Nov. 2002. www.hexcel.com.

Cellular Materials International, Inc. Cellular Materials—Home Page (believed to have been offered for sale, publicly used, and/or published prior to the filing date of this application) www.cellularmaterials.com.

* cited by examiner

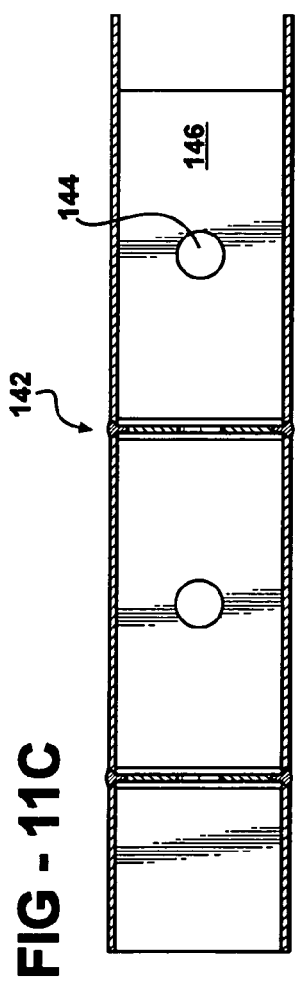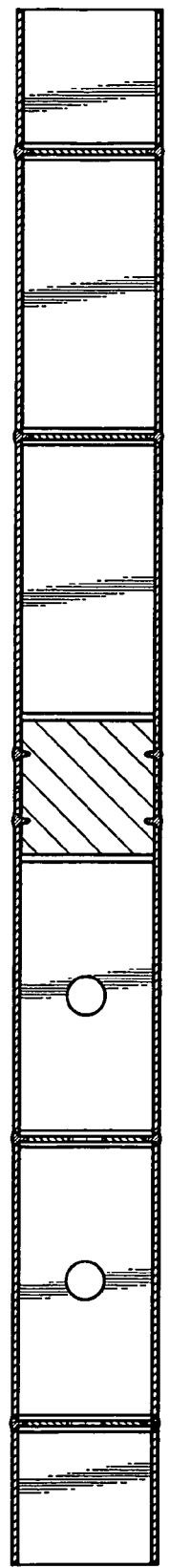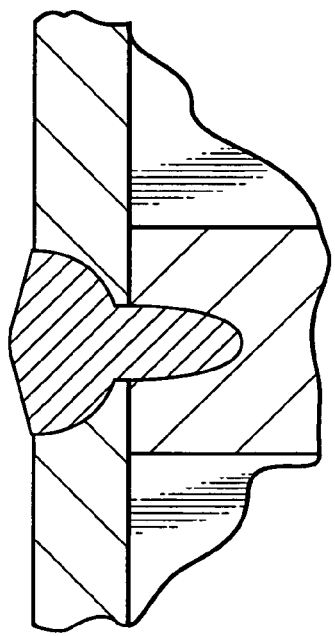

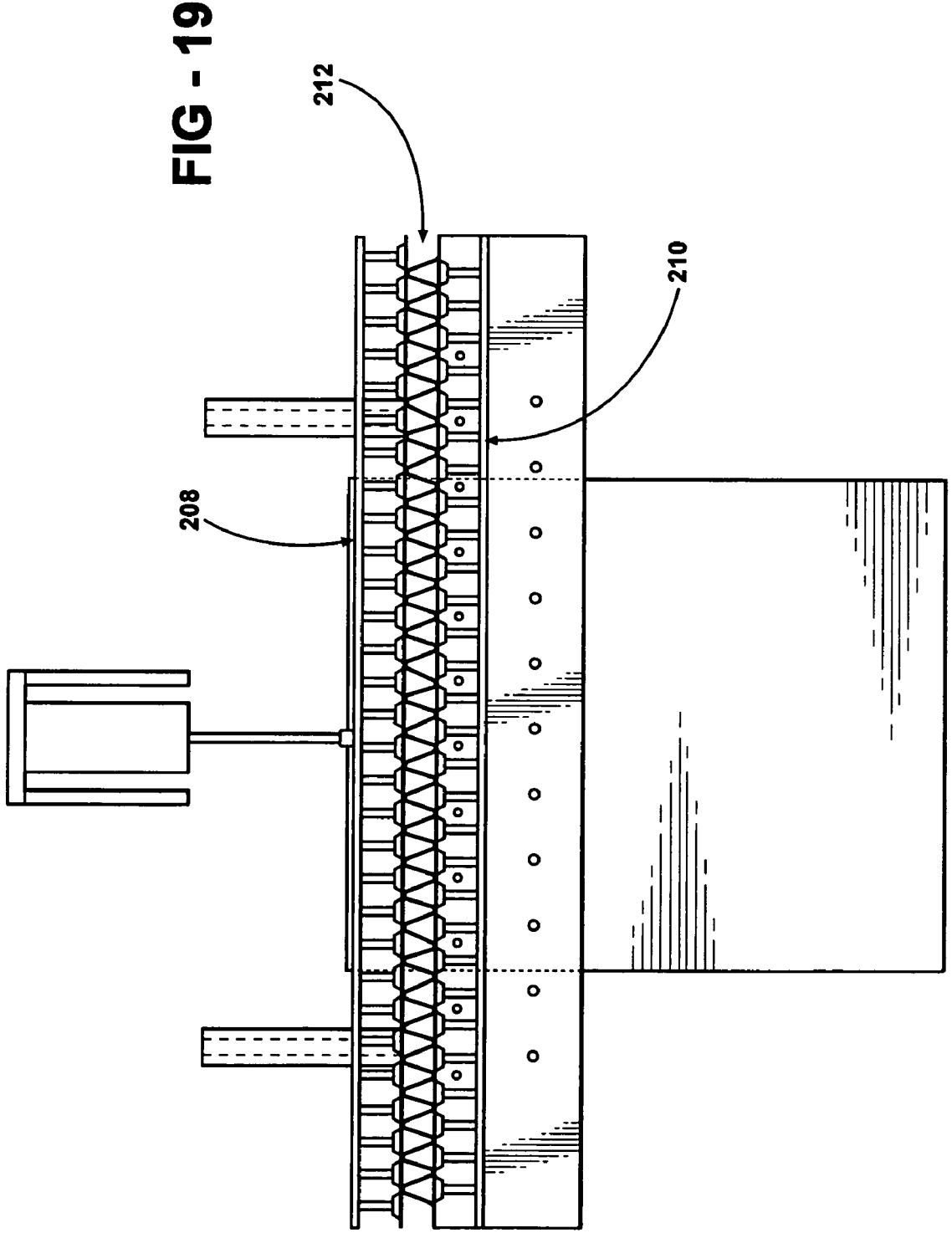

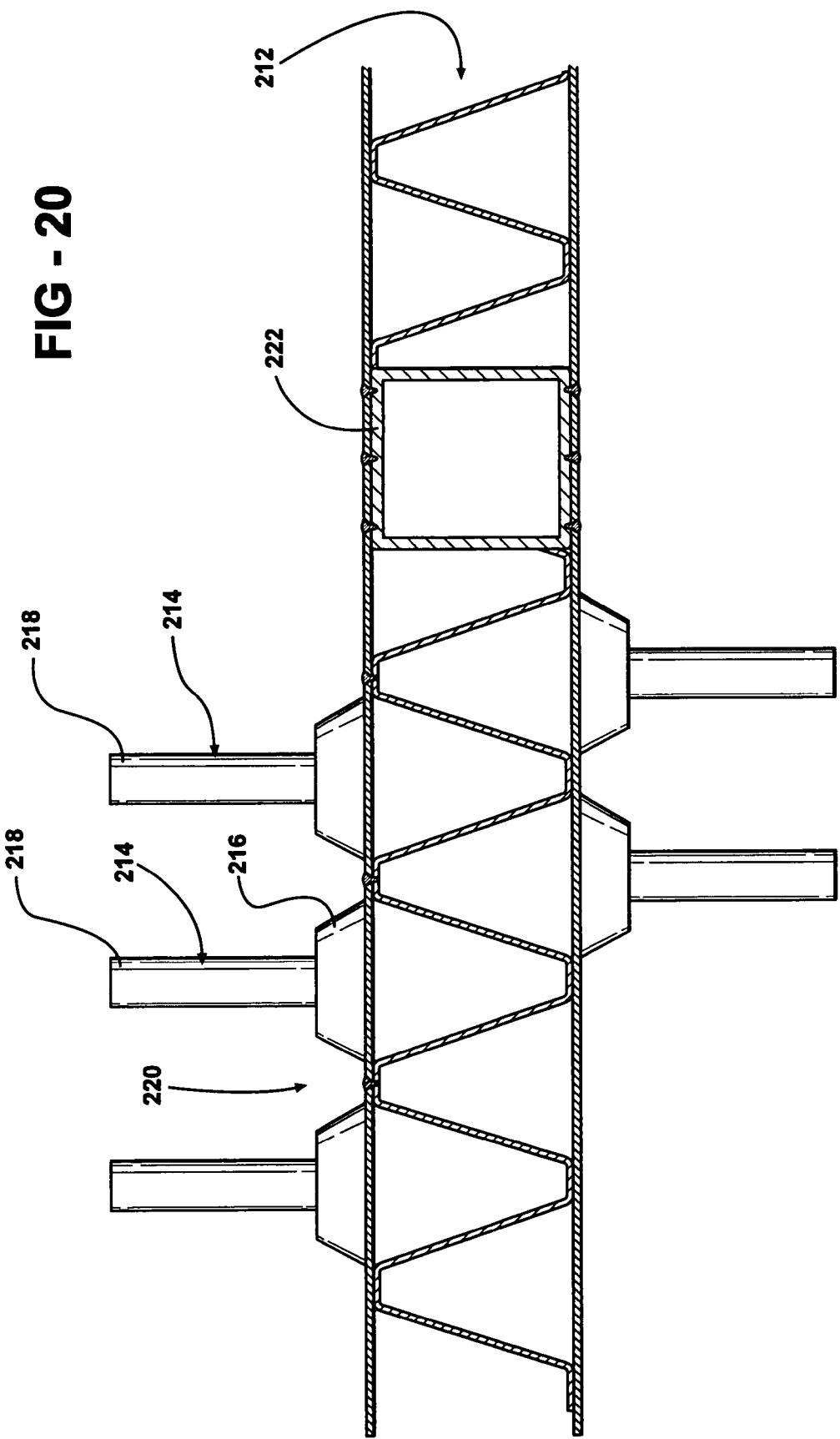

AUTOGENOUSLY WELDED METALLIC CELLULAR STRUCTURES AND METHODS FOR FORMING SUCH STRUCTURES

REFERENCE TO RELATED APPLICATIONS

This application claims priority from U.S. Provisional Patent Application Ser. Nos. 60/702,351, filed Jul. 25, 2005, and 60/692,321, filed Jun. 20, 2005, the entire content of both of which are incorporated herein by reference.

STATEMENT OF GOVERNMENT INTEREST

The invention described herein was made in part with Government support under Contract Nos. N00024-02-D-6604 awarded by the Office of Naval Research. The United States Government may have certain rights in this invention.

FIELD OF THE INVENTION

The present invention relates generally to welded structures and, more specifically, to structures and methods for forming structures using autogenous welding.

BACKGROUND OF THE INVENTION

Laser welding is an attractive process for producing stiff, strong, lightweight structures. FIG. 1 is a drawing of a corrugated core sandwich panel produced by laser welding with a high strength and stiffness to weight ratio. The illustrated panel is referred to as a LASCOR panel, and is representative of the prior art. As shown in FIG. 1, the LASCOR panel consists of a pair of face sheets welded to a corrugated core. The face sheets are attached to the core using autogeneous laser stake welds, which means that no filler material is used. As shown, the corrugated core has upper and lower generally flat portions and the face sheets are welded to the flat portions. As such, the autogeneous welds act to join two generally parallel thin pieces of metal to one another. As will be clear to those of skill in the art, the panel shown in FIG. 1 has a higher stiffness in a direction parallel to the corrugations than in a direction perpendicular to the corrugations.

SUMMARY OF THE INVENTION

The present invention provides a variety of improved welded structures including one or more face sheets and a core, which may be cellular. In one embodiment, an autogenously welded structure is provided that includes a first face sheet, a plurality of individual stiffener elements, and a second face sheet. The stiffener elements each have a first edge disposed against the first face sheet and an opposed second edge. Each stiffener element has a central portion extending between the opposed edges. The central portion is disposed at an angle to the first face sheet. The stiffener elements include at least some stiffener elements that are disposed at an angle to at least some of the other stiffener elements. The second face sheet is disposed against the second edges of the stiffener elements and the first and second face sheets are autogenously welded to the edges of the stiffener elements. The autogenous welding may be performed using laser or electron beam autogeneous welding. The autogeneous welding may pre-stress the face sheets. In some versions of the present invention, the central portions of the stiffener elements are disposed generally perpendicular to the face sheets. In some versions, the welded structure is a panel, with the face sheets being generally planar and parallel to each other. The stiffener elements may also be planar members. At least some of the stiffener elements may each further include a first end portion that extends from the first edge and the second end portion that extends from the second edge. These end portions may be generally parallel to the face sheets and may extend in the same direction or may extend in opposed directions. Alternatively, the end portions may be folded back onto the central portion and be generally parallel thereto.

In some versions of the present invention, the stiffener elements mechanically interlock such that the stiffener elements form a self-supporting grid. The stiffener elements may have notches defined therein which allow for the mechanical interlocking. In further versions of the present invention, some or all of the stiffener elements have one or more holes defined therethrough, such as in the central portion.

In further versions of the present invention, the stiffener elements cooperate to define a plurality of cells. The cells may be generally rectangular or may have other shapes. Some of the stiffener elements may have holes defined therethrough, such that at least some adjacent cells are in communication through the holes. Alternatively, at least some of the cells may be in fluid communication with at least some of the other cells using any approach. All of the cells may be generally the same size, or may have different sizes.

Optionally, embodiments of the present invention may include a reinforcing member that is disposed between the face sheets and has opposed faces that are autogenously welded to the face sheets. A hole may be defined through the face sheets and the reinforcing member. The reinforcing member may be a generally continuous body of material that extends between the face sheets. Alternatively, an optional reinforcing member may be autogenously welded to an outer side of one of the face sheets. The reinforcing member may have side edges that are generally disposed in register with stiffener elements defining one or more cells. The side edges of such a reinforcing member may be beveled with a backcut adjacent the outer side of the face sheet.

In some embodiments of the present invention, the stiffener elements each have approximately the same thickness, while in other embodiments the thickness varies.

The face sheets may be said to have a perimeter edge and in some embodiments of the present invention, a rim member is provided that has opposed faces autogenously welded to the face sheets adjacent at least a portion of the perimeter edge. The rim member may be positioned such that a portion of the rim member is disposed between the face sheet and a portion of the rim member extends beyond the perimeter edge. The rim member may comprise a generally continuous body of material.

In an alternative embodiment of the present invention, the face sheets are both generally cylindrical and at least some of the stiffener elements extend radially therebetween.

In some versions of the present invention, the stiffener elements include a first set of generally parallel stiffener elements and a second set of generally parallel stiffener elements, with the second set being disposed at an angle to the first set. The angle between the sets may be about 90 degrees.

The present invention also provides a method for forming a welded structure, such as discussed above. According to the method, a stiffener core is provided with a first side and a second side. A first face sheet and a second face sheet are also provided. A restraining fixture is provided having an upper portion and a lower portion. The face sheets and the stiffener core are disposed between the upper and lower portions of the restraining fixture, such that one face sheet is disposed adjacent the lower portion and the other face sheet is disposed against the upper portion with the stiffener core disposed between the face sheets. The face sheets and stiffener core are restrained between the upper and lower portions of the restraining feature, such that the face sheets and stiffener core are restrained in a predetermined shape. The first face sheet and the second face sheet are autogenously welded to the stiffener core while the face sheets and the stiffener core are restrained in the predetermined shape. The method forms a welded structure including the first and second face sheets with the stiffener core disposed therebetween.

The method may further include the steps of spot welding the first face sheet to the stiffener core and spot welding the second face sheet to the stiffener core, thereby forming an assembly of the first and second face sheets with the stiffener core retained therebetween. The step of disposing the face sheets and stiffener core between the upper and lower portions of the restraining fixture may comprise disposing this assembly formed by the spot welding steps between the upper and lower portions of the restraining fixture. The step of autogenously welding the first and second face sheets to the stiffener core may comprise autogenously welding with a plurality of continuous welds. The face sheets may be said to have opposing side edges and a central region midway between the side edges. The spot welding step may comprise welding near the central region and then welding closer to the side edges. The method may include the steps of providing a positioning fixture having an upper portion and a lower portion with the upper portion having a plurality of cross-members spaced apart so as to define a plurality of gaps therebetween. One side of the stiffener core is disposed on the lower portion of the positioning fixture and the face sheet is disposed on the other side of the stiffener core. The upper portion of the positioning fixture is disposed against the first face sheet and then the step of spot welding the first face sheet to the stiffener core is performed in the gaps between the cross-members. The cross-members may have a plurality of holes defined therethrough and the spot welding may additionally be performed through the holes in the cross-members. The cross members may further have a compliant layer with the compliant layer being positioned against the first face sheet during the positioning step.

In some versions of the method, the stiffener core comprises a plurality of individual stiffener elements, each having a first edge, an opposed second edge, and a central portion extending therebetween. With this version of the stiffener core, the autogenous welding step comprises welding the first and second face sheets to at least some of the edges of the stiffener elements. The stiffener elements may cooperate to form a grid with some elements being disposed at an angle to other of the elements.

The predetermined shape of the welded structure may be flat, with the welded structure being a panel. The autogenous welding is preferably laser or electron beam autogenous welding.

In some versions of the method, the restraining fixture has an upper portion and a lower portion each comprising a plurality of spaced apart cross members defining a plurality of gaps therebetween and the autogenous welding step comprises forming the welds in the gaps between the cross members. A second restraining fixture may also be provided, which has an upper and lower portion each including a plurality of spaced apart cross members defining a plurality of gaps therebetween. The welded structure may be disposed between the upper and lower portion, such that the spaced apart cross members are disposed against the faces and the previously formed welds are disposed at an angle to the cross members of the second restraining fixture. Autogenous welding may then be performed to weld both face sheets to the stiffener core, with the welds being formed in the gaps between the cross members of the second restraining fixture. The first and second restraining fixture may be the same fixture, with the method further comprising removing the welded structure from the fixture and rotating the assembly such that the welds are at an angle to the cross members.

The restraining fixture may include a pair of rotary supports supporting the upper and lower portions and an actuator for moving one of the portions relative to the other. The cross members of the restraining fixture may be T-shaped members.

The present invention also provides a restraining fixture for restraining components of a welded structure during manufacture. The components include a face sheet and a stiffener core disposed therebetween. The fixture includes an upper portion having a plurality of generally co-planar cross members defining a plurality of gaps therebetween. It also includes a lower portion having a second plurality of generally coplanar cross members defining a plurality of gaps therebetween. A support structure supports the upper and lower portions in a generally parallel arrangement. The support structure is operable to move the upper and lower portions towards one another to restrain the components therebetween. The support structure may include a pair of rotary supports for rotating the upper and lower portions together about an axis and an actuator for moving the portions towards one another.

BRIEF DESCRIPTION OF THE DRAWINGS

FIG. 11C is a cross-sectional view of a portion of the welded structure similar to the structure in FIG. 11A, but with openings provided in the stiffener elements;

FIG. 11D is a cross-sectional view of a portion of a pair of welded structures according to the present invention that are joined using a rim member interconnecting their edges;

FIG. 12 is a detailed view of an exemplary weld formed using an autogenous welding process to join a face sheet to a stiffener element;

FIG. 19 is a cross-sectional view of the fixture of FIG. 18; and

FIG. 20 is a detailed cross-sectional view of the fixture of FIGS. 18 and 19 showing details of the cross members that restrain the assembly during autogenous welding.

DETAILED DESCRIPTION OF THE PREFERRED EMBODIMENTS

The present invention provides a variety of improved welded structures including one or more face sheets and a core, which may be cellular. In one embodiment of the present invention, the face sheets are each generally planar sheets of metal and the core is a grid of stiffener elements that define a plurality of cells. The face sheets are autogenously welded to opposite sides of the grid of stiffener elements thereby forming a sandwich panel. In some versions, the stiffener elements are flat, while in others they are Z-shaped, or U-shaped, or have other shapes. The stiffener elements may be notched or otherwise formed such that they interconnect to form a self-supporting grid to simplify assembly, or they may be non-self-supporting and held in place by a positioning fixture during assembly. The stiffener elements may take forms other than a grid of cells, although a cellular approach is preferred. The cells may have a variety of shapes, with square or rectangle being typical. In alternative versions, one or both face sheets are non-planar, such as curved in one or more dimensions. As one example, the face sheets may both be generally cylindrical, with the stiffener elements extending therebetween. In any version in which the stiffener elements form a grid of cells, the cells may be uniform in size, or may vary in size in different locations in the structure. Such variations in cell size, and in the use of the stiffener elements, may be used to control localized strength, buckling, stiffness and other features. Versions of the present invention may also include reinforcement members either within the cells or on the outer surface of one of the face sheets for use in attaching other elements to the structure or placing openings or holes therethrough. Further, a plurality of structures may be interconnected in a variety of ways, including the use of a rim member to interconnect edges of one or more structures. As will be discussed further below, the present invention also provides methods for forming autogenously welded structures and fixtures for use in such methods.

The present invention forms welded structures using autogenous welding. Autogenous welding, as used herein, is defined as welding using no filler material. According to the present invention, such autogenous welding is preferably performed using laser welding. Electron beam welding may also be used, though this typically requires welding in a vacuum. TIG welding may also be performed autogenously and may be used for some embodiments of the present invention depending on this thickness of the face sheets and stiffener elements. Generally, autogenous TIG welding gives a more diffuse spatial distribution of energy, thereby lowering the weld rate and increasing distortion, which is not preferred.

Figure 2:
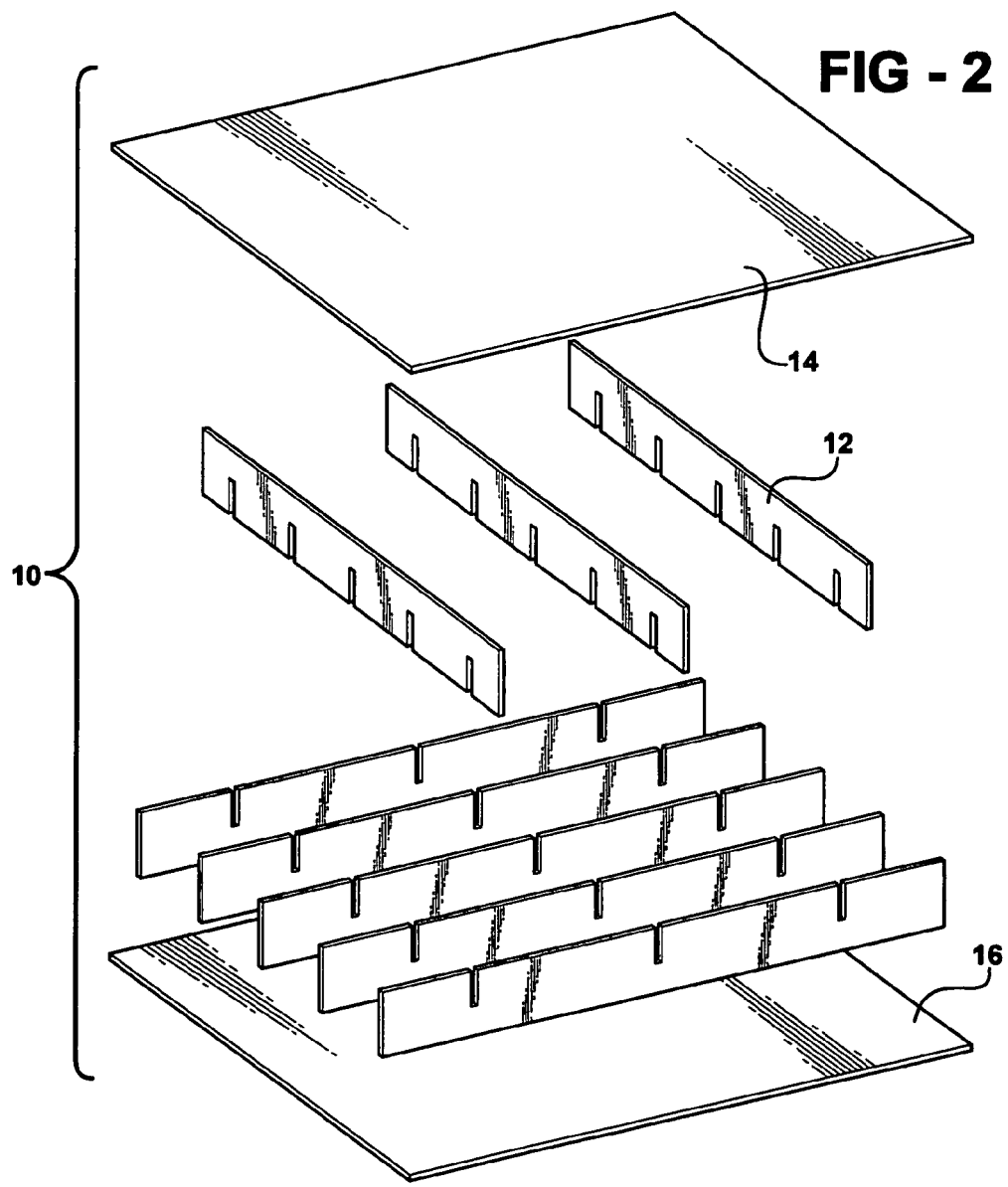
FIG. 2 is an exploded perspective view of components used to form an embodiment of a welded structure according to the present invention.
Figure 3:
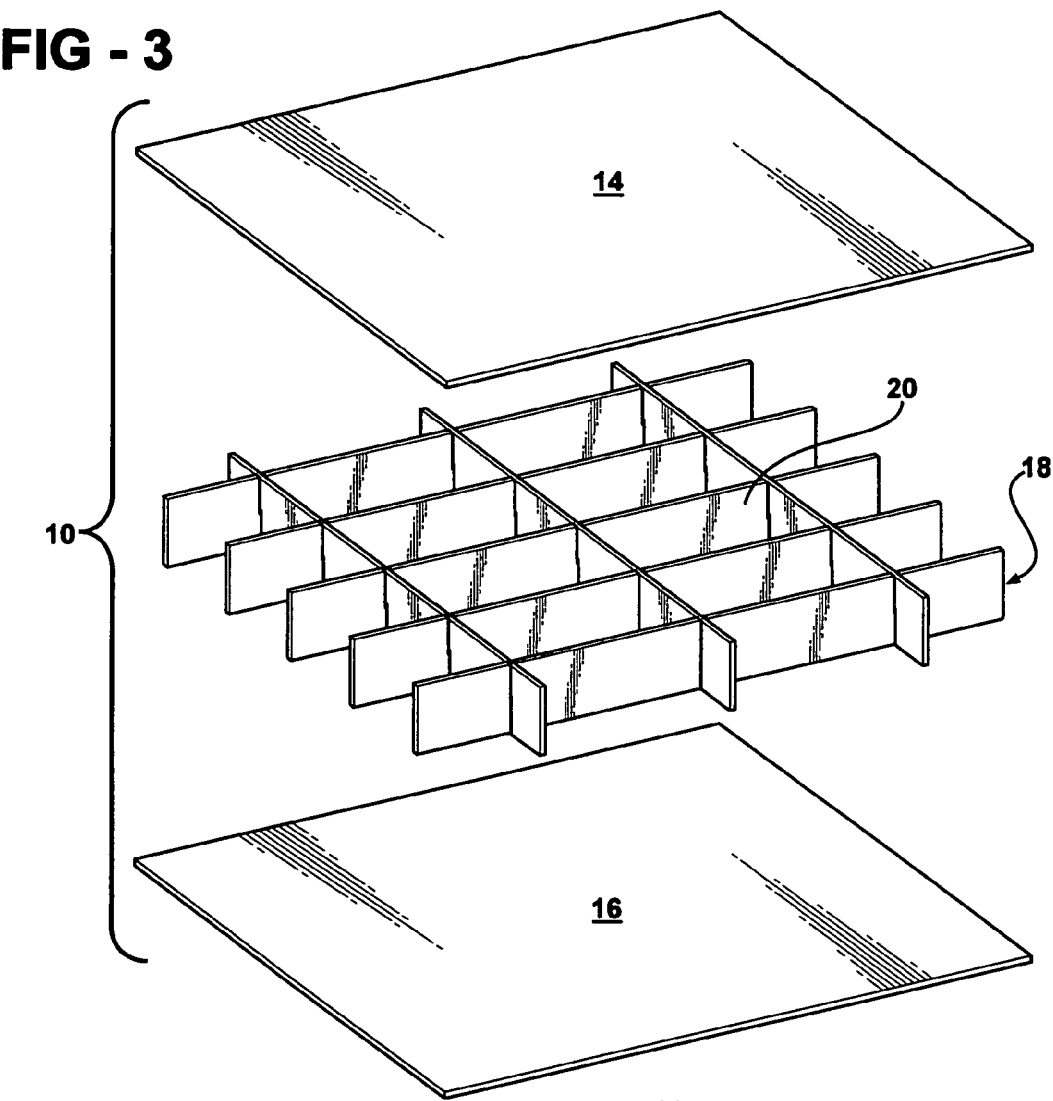
FIG. 3 is an exploded perspective view of the components of FIG. 2 with the stiffener core assembled into a self-supporting grid.
Figure 4:
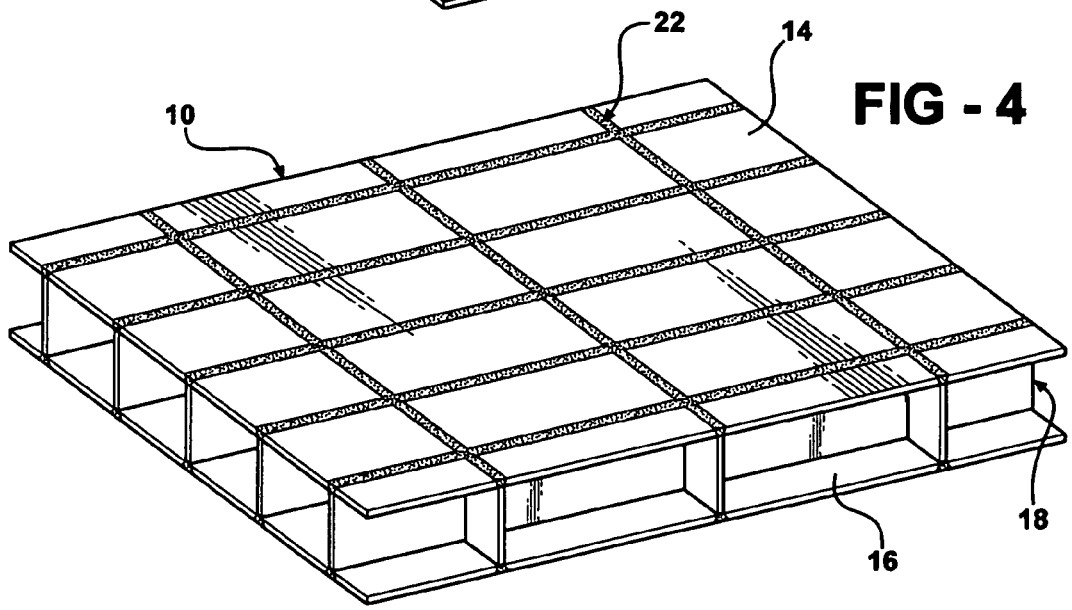
FIG. 4 is a perspective view of a welded structure according to an embodiment of the present invention after assembly from the components shown in FIGS. 2 and 3.

FIG. 2 provides an exploded perspective view of the components used to form an embodiment of a small welded structure according to the present invention. The structure 10 includes a plurality of stiffener elements 12, a first face sheet 14 and a second face sheet 16. As shown in FIG. 2, the stiffener elements each include notches which allow the stiffener elements to be assembled into a self-supporting grid that acts as a stiffener core 18, as shown in FIG. 3. The self-supporting grid 18 may be said to define a plurality of cells 20. While it is preferred that the stiffener elements 12 interconnect to form a self-supporting grid, it is also preferred that they not be rigidly interconnected directly to one another, such as by welding or bonding them to one another. Instead, they are interconnected only via the face sheets of the assembled structure. FIG. 4 shows the assembled autogenously welded structure 10. As shown, a grid of autogenous welds 22 interconnects the first face sheet 14 with the stiffener elements of the stiffener core 18. Likewise, the second face sheet 16 is autogenously welded to the stiffener elements. The welds 22 is this embodiment include a first series of welds running in one direction and a perpendicular series of welds running in another direction.

Figure 5A:
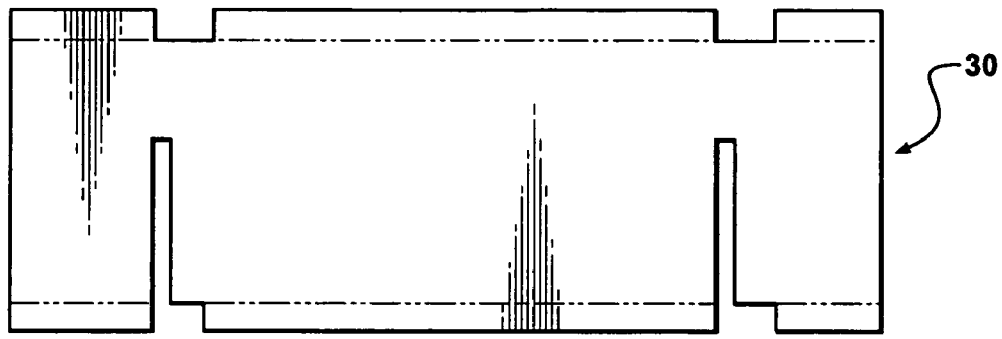
FIG. 5A is an elevational view of a stiffener element for use with the present invention, prior to bending.
Figure 5B:
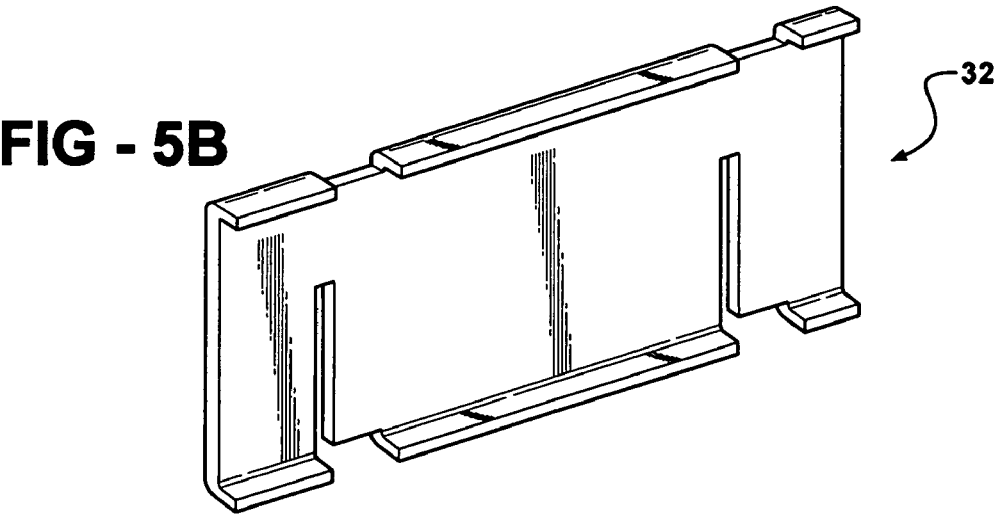
FIG. 5B is a perspective view of the stiffener element of FIG. 5A after the element has been bent into a U-shaped configuration.
Figure 5C:
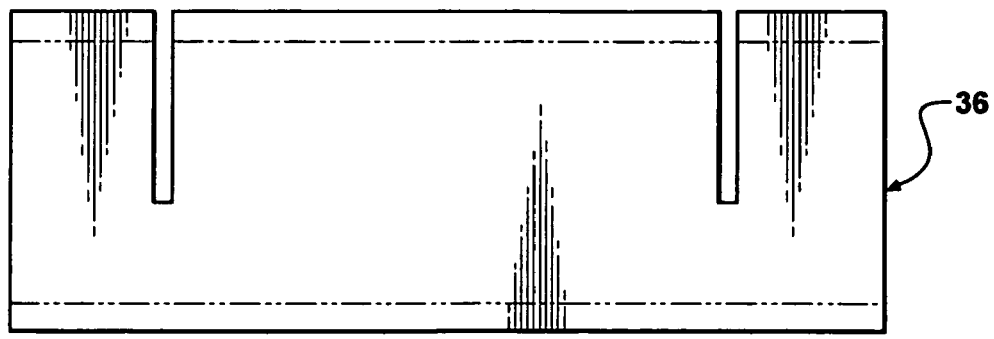
FIG. 5C is an elevational view of another stiffener element for use with the present invention, prior to bending.
Figure 5D:
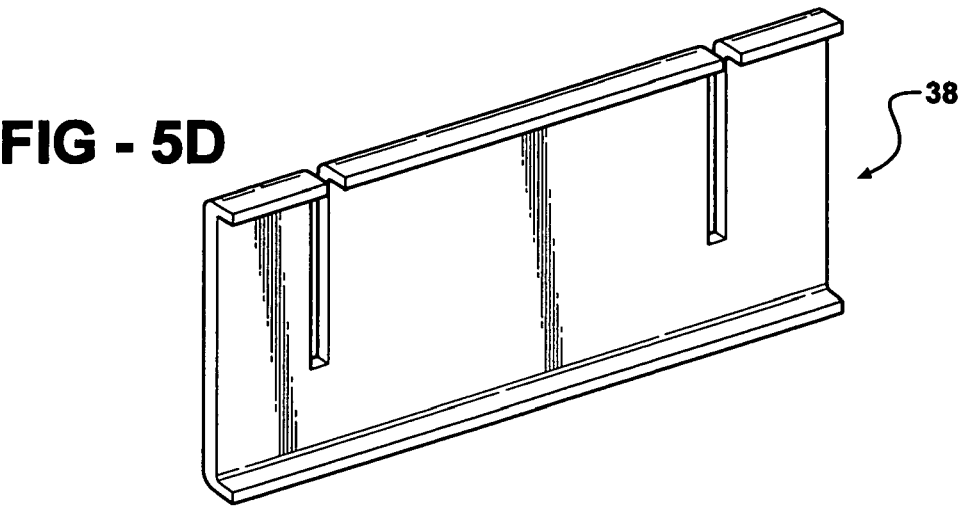
FIG. 5D a perspective view of the element of FIG. 5C after the element has been bent into a U-shaped configuration.

Referring again to FIG. 2, the stiffener elements 12 are preferably laser cut so as to provide very accurate notches for interconnecting the stiffener elements into a grid. Alternatively or additionally, a fixture may be used to hold the stiffener elements into the pattern necessary for welding to the first face sheet. FIGS. 5A-5C and 6A-6C illustrate an alternate approach to providing stiffener elements. FIG. 5A shows a metal blank which is preferably laser cut so as to have the illustrated shape. The stiffener element blank 30 has a plurality of notches and a dashed line indicates fold lines for forming the blank 30 into a U-shaped or Z-shaped stiffener element. FIG. 5B illustrates the blank 30 after being folded into a U-shaped stiffener element 32. FIG. 5C illustrates the blank 34 for forming the mechanically interlocked stiffener element. FIG. 5D illustrates the blank 34 after being folded into a U-shaped stiffener element 35. As will be clear to those of skill in the art, stiffener elements 32 and 35 enable autogenous welding of the face sheets to thinner stiffener elements than possible with a flat stiffener element such as 12 in FIG. 2.

Figure 6A:
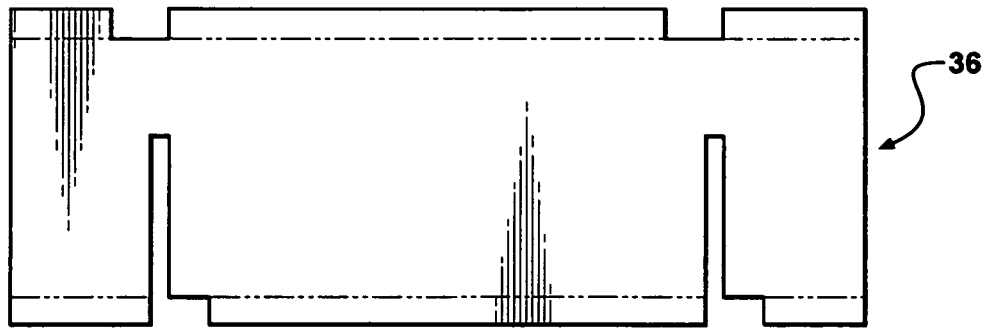
FIG. 6A is an elevational view of another version of a stiffener element for use with the present invention, prior to bending.
Figure 6B:
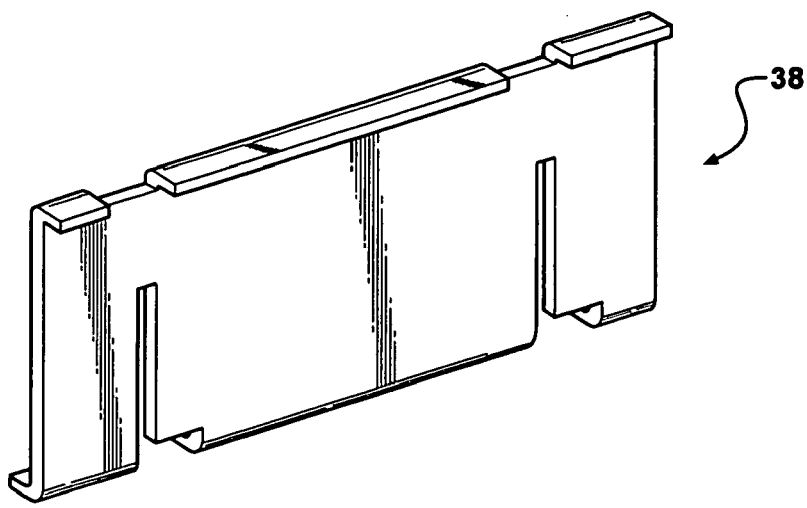
FIG. 6B is a perspective view of the stiffener element of FIG. 6A after bending into a Z-shaped configuration.
Figure 6C:
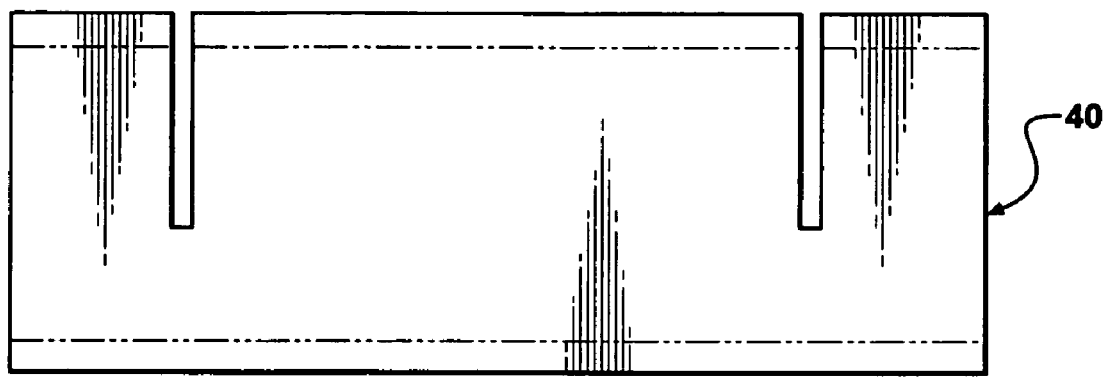
FIG. 6C is an elevational view of yet another stiffener element for use with the present invention, prior to bending.
Figure 6D:
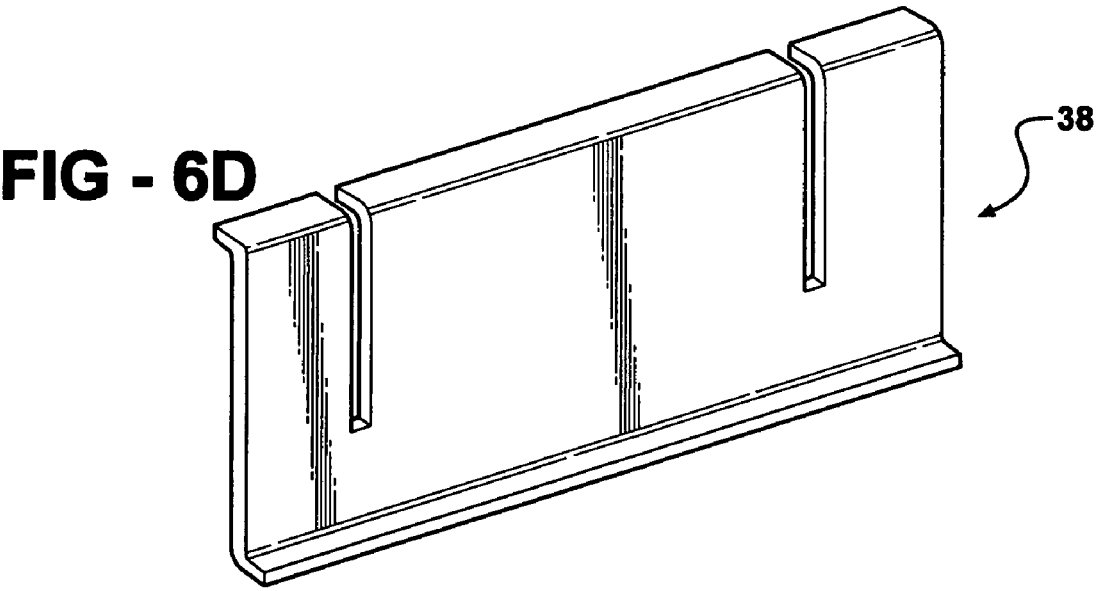
FIG. 6D is a perspective view of the stiffener element of FIG. 6C after bending into a Z-shaped configuration.

FIG. 6A shows an alternative blank 36 which may be folded into a Z-shaped stiffener element 38 as shown in FIG. 6B. FIG. 6C illustrates the blank 40 for forming the mechanically interlocked stiffener element. FIG. 6D illustrates the blank 40 after being folded into a Z-shaped stiffener element 41. As will be clear to those of skill in the art, the shapes of the notches in the blanks 30, 34, 36, and 38 and the stiffener elements 32, 35, 38 and 41 allow the stiffener elements to be assembled into a self-supporting grid. Other notch configurations may also be used. Also, different stiffener designs may be mixed in one structure.

Figure 7A:
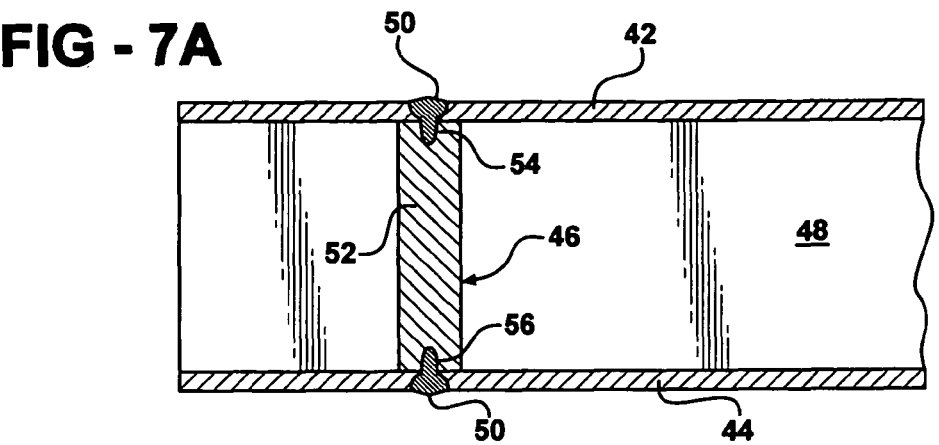
FIG. 7A is a cross-sectional view of a portion of a welded structure according to an embodiment of the present invention having a flat stiffener element.

Referring now to FIG. 7A, a portion of a welded structure according to an embodiment of the present invention is shown in cross-section. This embodiment includes a first face sheet 42, a second face sheet 44, and a flat stiffener element 46 extending therebetween. A perpendicularly extending stiffener element is shown at 48. The face sheets 42 and 44 are autogenously welded to the stiffener element 46 using welds 50. In this embodiment, the stiffener element 46 is a flat stiffener element. It may be said to have a central portion 52 that extends between a first edge 54 and a second edge 56. The first face sheet 42 is autogenously welded to the first edge 54 and the second face sheet 44 is autogenously welded to the second edge 56. As shown, the assembly creates a T-shaped junction between the stiffener element 46 and the face sheets. Unlike the panel of FIG. 1, wherein the welds are provided between the face sheets and a relatively large flat section of the stiffener core, the welds for the embodiment of FIG. 7A require very precise positioning.

Figure 7B:
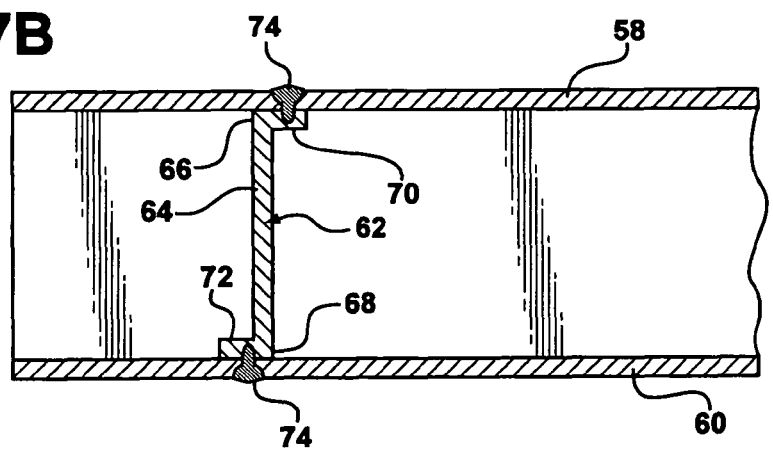
FIG. 7B is a cross-sectional view of a portion of the welded structure according to another embodiment of the present invention having a Z-shaped stiffener element.

FIG. 7B shows a cross-section of a portion of a welded structure according to an alternative embodiment of the present invention utilizing a Z-shaped stiffener element. Again, the structure has a first face sheet 58, a second face sheet 60 and a stiffener element 62 extending therebetween. The stiffener element 62 may be said to have a central portion 64 that extends between a first edge 66 and an opposed second edge 68. This version of stiffener element further includes a first end portion 70 that extends from the first edge and a second end portion 72 that extends from the second edge 68. These end portions are generally parallel to their respective face sheets. The face sheets 58 and 60 are welded to the stiffener element at the edges 66 and 68 as shown by welds 74.

Figure 7C:
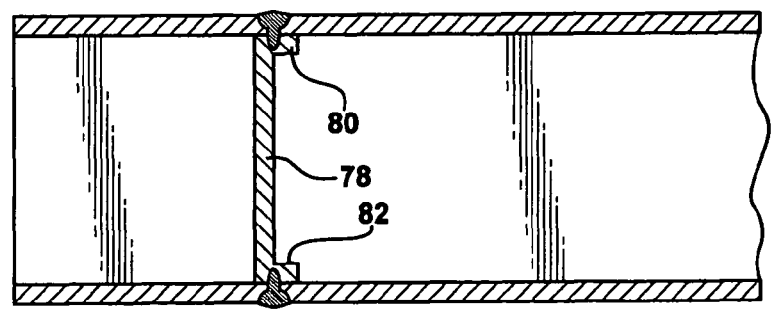
FIG. 7C is a cross-sectional view of a portion of the welded structure according to another embodiment of the present invention having a U-shaped stiffener element.

Referring now to FIG. 7C, yet another embodiment is shown utilizing a U-shaped stiffener element 78. As with the version of FIG. 7B, the U-shaped stiffener includes end portions 80 and 82 that extend from their respective edges.

Figure 7D:
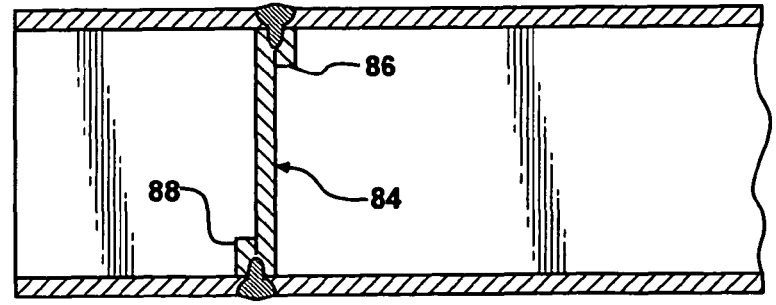
FIG. 7D is a cross-sectional view of a portion of a welded structure according to another embodiment of the present invention having a stiffener element with end portions that are folded back on itself.

Referring now to FIG. 7D, yet another version is shown, this time utilizing the stiffener element 84 with end portions 86 and 88 that are folded back onto the central portion such that the central portion and the two end portions are parallel.

Figure 8A:
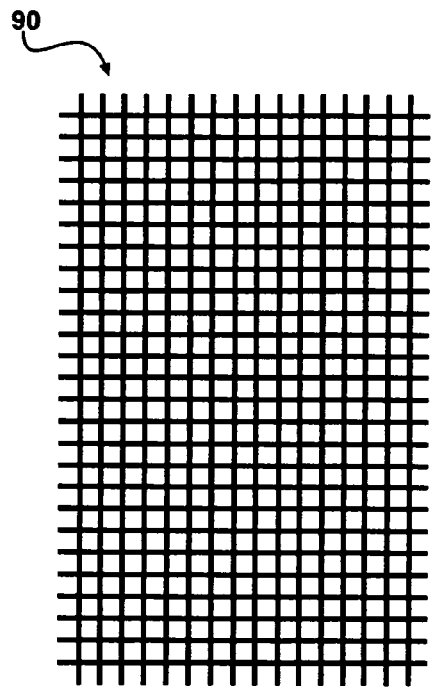
FIG. 8A is a plan view of a grid of stiffener elements that exemplifies one version for use with the present invention.
Figure 8B:
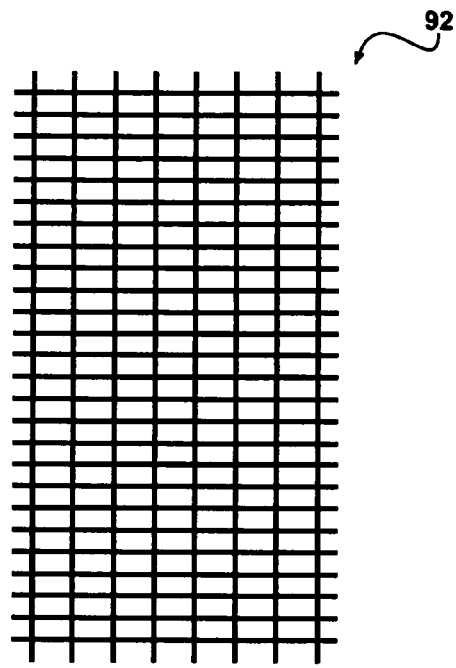
FIG. 8B is a plan view of an alternative grid of stiffener elements.
Figure 8C:
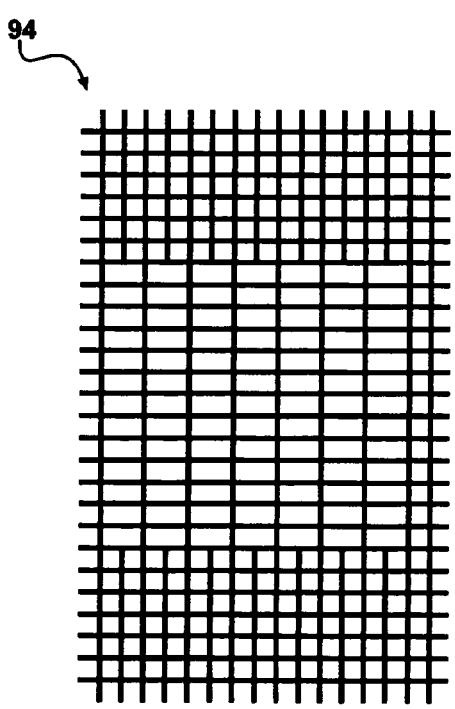
FIG. 8C is a plan view of a further version of a grid of stiffener elements for use with the present invention.

Referring now to FIGS. 8A-8D, various stiffener element grid patterns are illustrated. As will be clear to those of skill in the art, the shape, size, thickness and other aspects of the stiffener elements may be varied so as to alter the structural characteristics of a welded structure according to the present invention. Further, the pattern used for the grid of stiffener elements may be adjusted depending on the desired characteristics of the resulting structure. FIG. 8A illustrates a grid 90 for forming a generally rectangular panel or structure. The plurality of stiffener elements used to form the grid 90 define a plurality of generally square cells of uniform size and shape. If a pair of face sheets are welded to all the stiffeners in the grid 90, the resulting structure will have similar mechanical characteristics in both the long and short directions. As will be clear to those of skill in the art, in some applications it may be desirable to alter the characteristics. FIG. 8B illustrates a grid 92 wherein some of the stiffener elements in the long direction have been eliminated. This provides a resulting structure that is stiffer in one direction than the other. As will be clear to those of skill in the art, the same result with the square cell structure illustrated in FIG. 8A can be accomplished by decreasing the thickness of the long stiffener elements. FIG. 8C illustrates a grid 94 with another configuration. As compared to the grid of FIG. 8A, the grid 94 has some of the stiffener elements in the long direction removed, but only in the middle of the grid. Such a pattern may be useful where the resulting structure will be supported locally along the long edges near the upper and lower ends. One example would be the use of a structure as a door, wherein hinges are provided along one edge near the upper and lower ends.

Figure 8D:
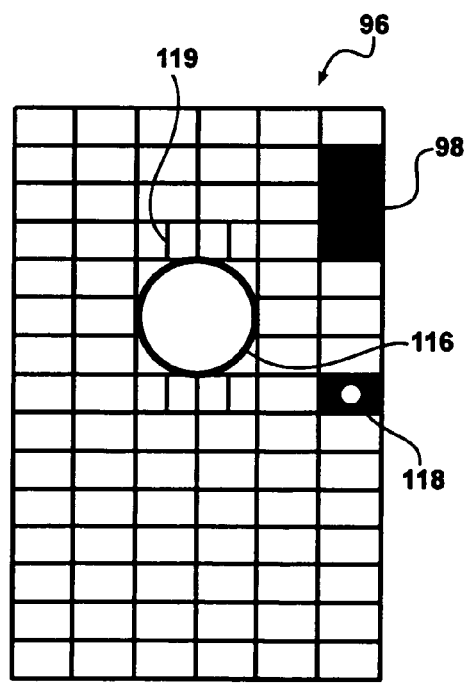
FIG. 8D is a plan view of yet another version of a grid of stiffener elements for use with the present invention, including reinforcement members, which are optional features of the present invention.

FIG. 8D illustrates a grid 96 similar to the earlier grids, except with reinforcing members provided in the grid or on one of the face sheets. As shown, this grid has outer edges defined by the sides of stiffener elements, rather than defined by the ends of stiffener elements as in the earlier grids. This is an alternative that may be used with any of the designs herein.

Figure 9A:
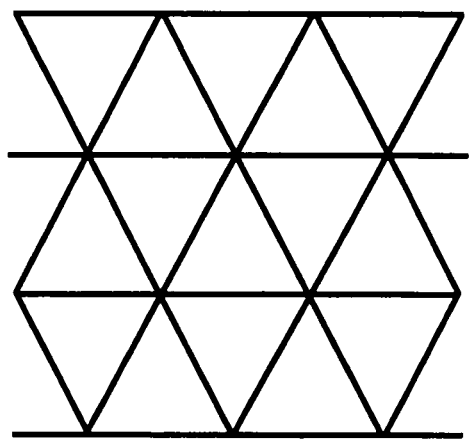
FIG. 9A is a schematic illustrating an alternative grid of stiffener elements.
Figure 9B:
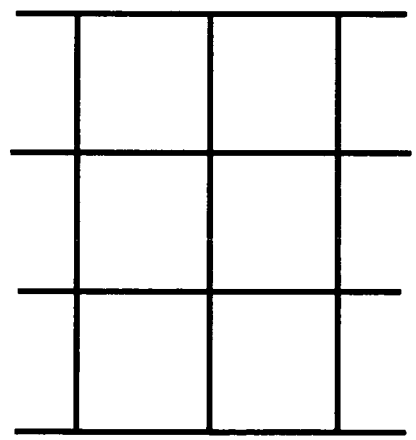
FIG. 9B is a schematic illustrating a square grid of stiffener elements.
Figure 9C:
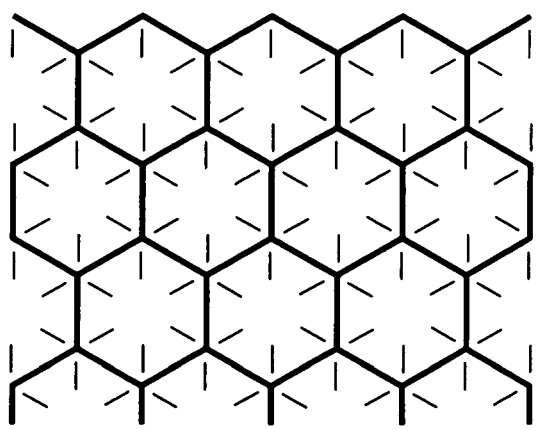
FIG. 9C is a schematic illustrating a six-sided cellular grid.

As will be clear to those of skill in the art, the stiffener elements may form a pattern other than a grid of square or rectangular cells. FIG. 9A illustrates a grid of triangular cells, while FIG. 9C illustrates a grid of six sided cells. Other shapes may be used as well. These other shapes may be achieved using shaped stiffener elements or interlocking stiffener elements that provide a self-supporting grid. As a further alternative, the grid may be formed using flat or shaped stiffener elements that are supported using a positioning fixture during initial assembly of the welded structure. In this approach, the positioning fixture may have a plurality of intersecting grooves in which stiffener elements are positioned. FIGS. 9A, 9B and 9C may also be considered to be schematics of a pattern of slots in a positioning fixture for supporting the stiffener elements. The pattern of the stiffener elements may be altered by not filling all of the slots. In FIG. 9C, main slots are shown in dark lines, while dashed lines show optional slots that could be extended between the main slots to provide easier machining or flexibility in providing the grid of stiffener elements.

The stiffener elements illustrated herein are disposed at an angle of about 90 degrees to the face sheets, and have generally planar central portions. Alternatively, some or all of the stiffener elements can be disposed at other angles relative to the face sheets, and/or may have non-planar central portions. For example, the central portions may be curved, which would provide a structure that is less stiff in compression. The stiffener elements may also have non-uniform thickness either edge to edge or end to end. For example, the stiffener elements could be thinner in the central portion and thicker near the edges.

Figure 10A:
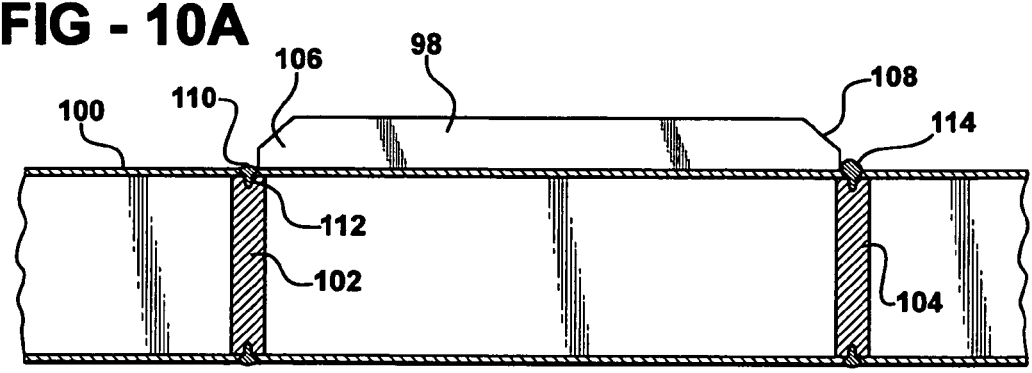
FIG. 10A is a cross-sectional view of a portion of a welded structure according to the present invention with an optional reinforcement member welded to one face.

Referring again to FIG. 8D, a rectangular reinforcing member is shown at 98. FIG. 10A shows the reinforcing member 98 in cross-section positioned against the outer surface of a face sheet 100 of an assembled structure. In this version, the reinforcing member is a body of material with preferably beveled edges that are positioned such that their outermost point lies in line or register with stiffener elements 102 and 104 disposed on the other side of the face sheet 100. The beveled edges 106 and 108 of the reinforcing member 98 form preferably an approximately 45 degree angle so as to allow normal incidence of the laser beam and easier access by a welding head. Alternatively, the edges may be more squared off. In the preferred embodiment, the outermost point of the edges 106 and 108 are cut off, as shown at 110 for edge 106. This allows the reinforcing member to be positioned such that its outermost point is directly over the edge of the autogenous weld 112 attaching the reinforcing member 102 to the face sheet 100. As will be clear to those of skill in the art, the weld joining the stiffener element 102 to the face sheet 100 forms a small ridge. Cutting the edge 106 allows the reinforcing member to set more flush on the face sheet. The reinforcing member 98 is then preferably welded to the remainder of the structure with a weld that is overlapping an existing weld. Such a weld is shown at 114 attaching the edge 110 of the reinforcing member 98 to the face sheet 100 and reinforcing member 104. Also, the reinforcing member could be interconnected with the welded structure using approaches other than welding, such as bonding or mechanical interconnection. The reinforcing member, such as 98, may be used to attach something to an outer surface of the structure. For example, if the structure is to be used as a door, the reinforcing member 98 may be used to attach a hinge or a latch. Clearly, the reinforcing member may have a different size, shape, location or use.

Figure 10B:
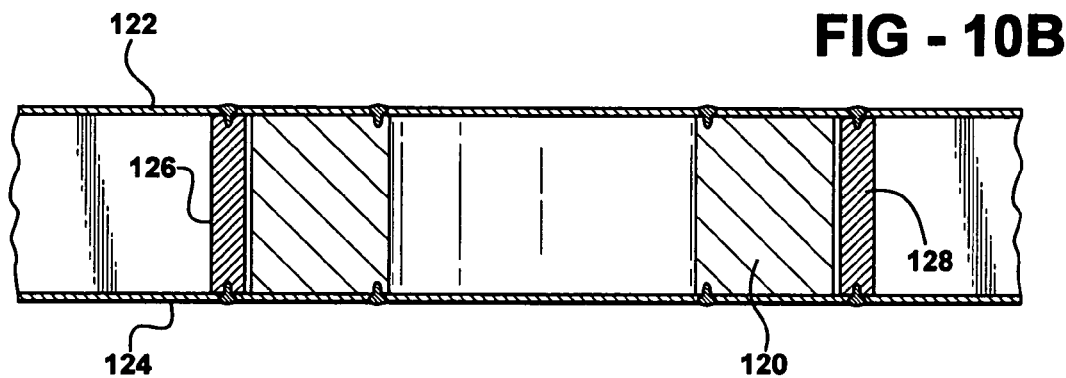
FIG. 10B is a cross-sectional view of a portion of a welded structure according to the present invention with an alternative version of an optional reinforcement member disposed between the face sheets so as to provide support for a hole through the face sheets and reinforcement member.

Referring again to FIG. 8D, another reinforcing member is shown at 116. In some applications, it may be desirable to provide a window or hole through a structure. Preferably, according to the present invention, such a feature is reinforced around the opening. Reinforcing member 116 is circle shaped, but could be many other shapes. It is preferably a body of material that is positioned within the grid and then welded to the face sheets. Another reinforcing member is shown at 118. Referring now to FIG. 10B, an exemplary reinforcing member is shown at 120. The reinforcing member 120 is positioned within a cell defined by stiffener elements 126 and 128 and between face sheets 122 and 124. The reinforcing member, a solid body of material, is preferably attached to face sheets 122 and 124 using circular stake welds. As such, the stiffener or reinforcing member is not directly attached to the stiffener elements, but is instead tied to the rest of the structure through the face sheets. A hole has been drilled through the face sheets and the reinforcing member concentric with the circular stake welds thereby providing a passage through the structure.

Referring again to FIG. 8D, additional stiffener elements are shown at 119. These stiffener elements with planar central sections provide local reinforcement to resist stress concentrations caused by the circular opening.

Figure 11A:
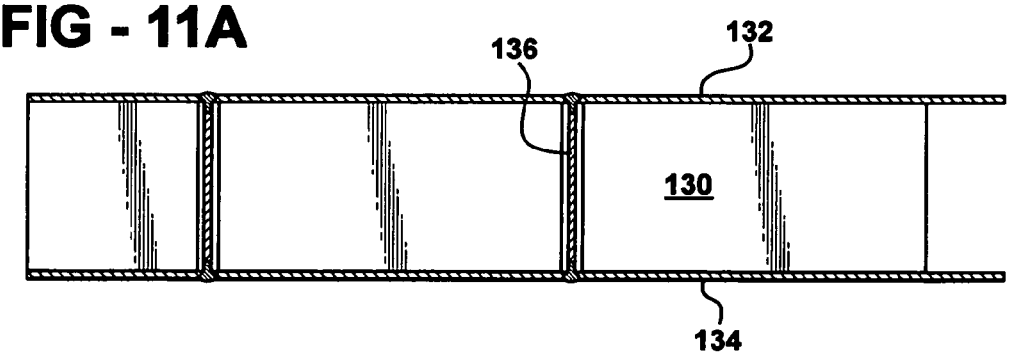
FIG. 11A is a cross-sectional view of a portion of an edge of a welded structure according to the present invention.

As will be clear to those of skill in the art, practical considerations limit the maximum size of the structure that may be formed. However, welded structures according to the present invention may be used to form much larger assemblies by interconnecting multiple structures. FIG. 11A illustrates a portion of a welded structure taking the form of a panel assembly, wherein a stiffener element 130 terminates short of the perimeter edge of the face sheets 132 and 134. FIG. 11A also illustrates a small gap between the stiffener element 130 and a perpendicular stiffener element 136. In preferred embodiments of the present invention, the stiffener elements are not directly rigidly interconnected, but are instead connected through the face sheets. The stiffener elements may be notched and interconnected to form a self-supported grid, however this interconnection is not a completely rigid interconnection. This allows slight movement of the stiffener elements relative to one another when a structure is loaded, and also allows fluid communication between cells defined by the stiffener elements. If such relative movement and/or fluid communication is not desired, the stiffener elements may be rigidly interconnected and/or sealed to one another.

Figure 11B:
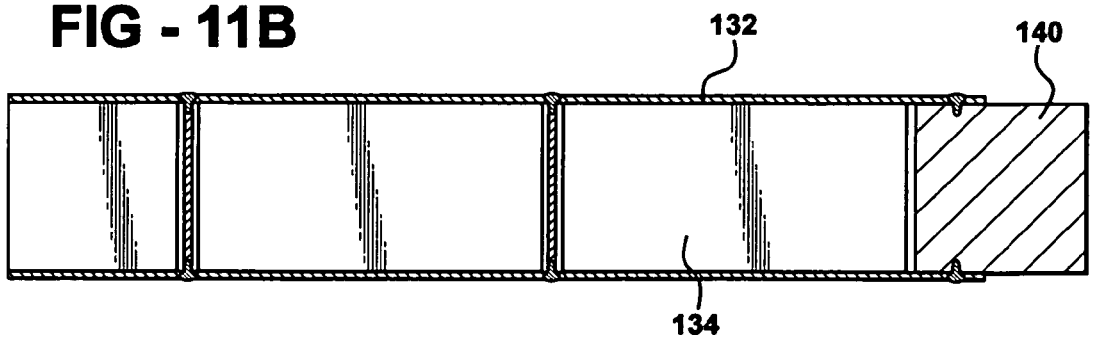
FIG. 11B is a cross-sectional view similar to FIG. 11A showing a rim member attached to the edge of the welded structure.

FIG. 11B illustrates the panel assembly of FIG. 11A with the addition of a rim element 140 positioned between the perimeter edges of the face sheets 132-134 and connected thereto by welds. Again, the connection between the rim element 140 and the stiffener elements is via the face sheets, rather than by direct connection. As will be clear to those of skill in the art, another panel assembly, such as shown in FIG. 11A, may be interconnected with the other side of the rim element 140 and welded thereto, thereby interconnecting two panel assemblies. The rim element is illustrated as a solid body of material. Alternatively, the element could be a box like structure or have other forms. Also, the rim element could be interconnected with the welded structure using approaches other than welding, such as bonding or mechanical interconnection.

FIG. 11C illustrates an alternative version of the panel assembly 142 wherein openings 144 are provided through the stiffener elements 146. As will be clear to those of skill in the art, openings may be provided near or at the neutral axis of the stiffener elements without substantially changing their effectiveness. This may be used to lighten the structure and/or provide fluid communication between adjacent cells. While the openings 144 in FIG. 11C are shown as uniform in size, additional openings or openings of other sizes may be provided, and the opening sizes and positions may vary from stiffener element to stiffener element. According to a further aspect of the present invention, a welded structure may be used as a storage device or container, with fluids or other materials contained in the cells defined by the grid of stiffening materials. In such a situation, fluid communication between the various cells may be desired, but flow may be limited to prevent sloshing. It may also be desirable to provide some areas of a structure that are sealed from other areas. For this purpose, a dividing element may be welded in. This may be useful to provide fluid flow channel, storage areas or for heat transfer elements, such as radiators.

FIG. 11D illustrates a panel assembly, such as 142, joined to a panel assembly, such as shown in FIG. 11A, using a rim member. FIG. 12 illustrates a detailed view of an autogenous weld. This weld is preferably formed using a laser welding approach.

Figure 13A:
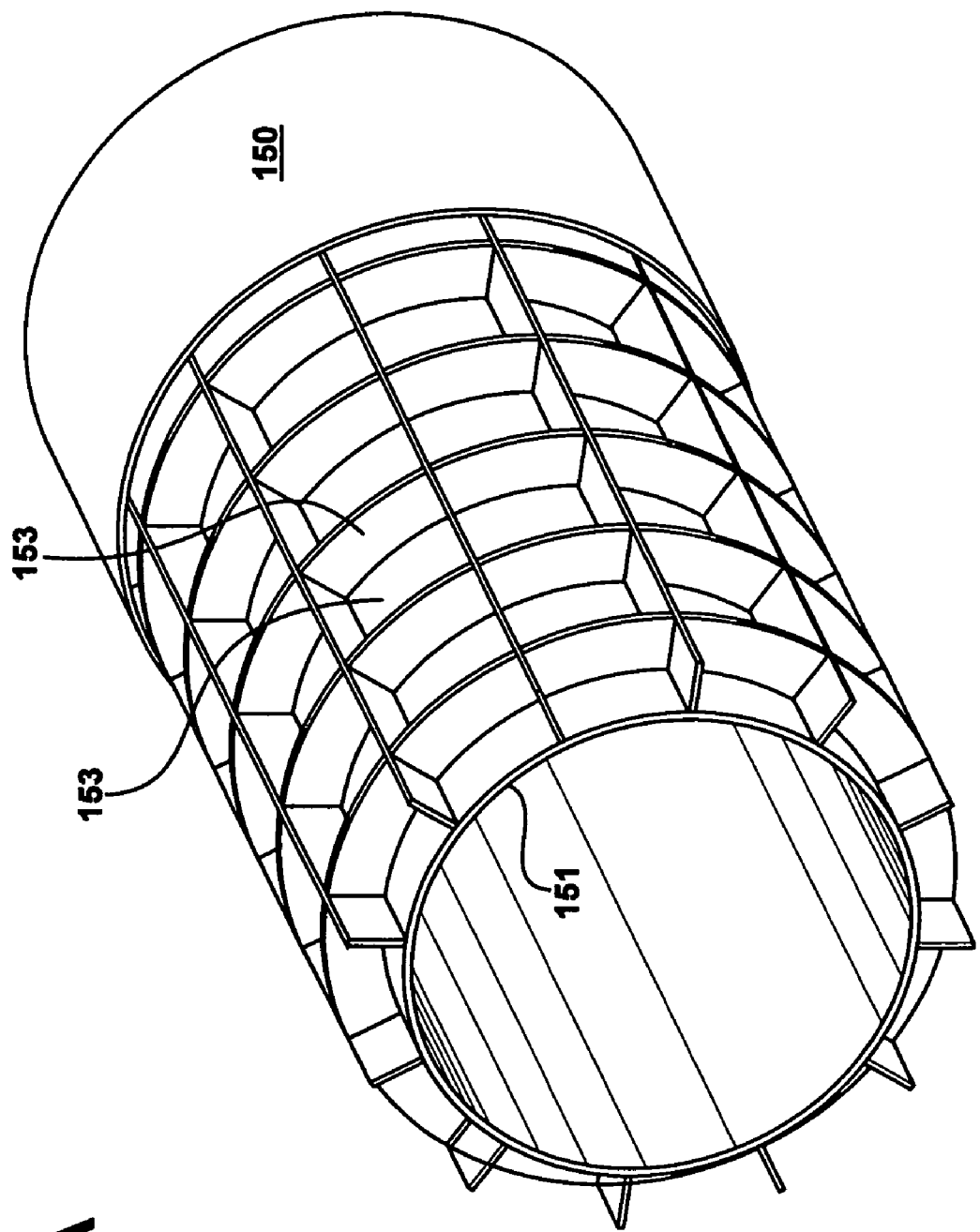
FIG. 13A is a perspective view of an alternative welded structure according to the present invention having generally cylindrical face sheets.

FIG. 13A illustrates an alternative embodiment of a welded structure according to the present invention in which the face sheets 150 (partially removed for clarity) and 151 are coaxial generally cylindrical tubes. A plurality of stiffener elements extend therebetween. The stiffener elements include radial elements 152 and circumferential elements 154. Welded structures according to the present invention may take a variety of other shapes and configurations. For example, the panels illustrated in earlier embodiments may have nonparallel face sheets, with the stiffener elements being shaped to accommodate the changing distance between the face sheets. Further, the face sheets and stiffener elements may be curved in one or more directions. Box-like structures may also be formed, as well as spherical structures.

Figure 13B:
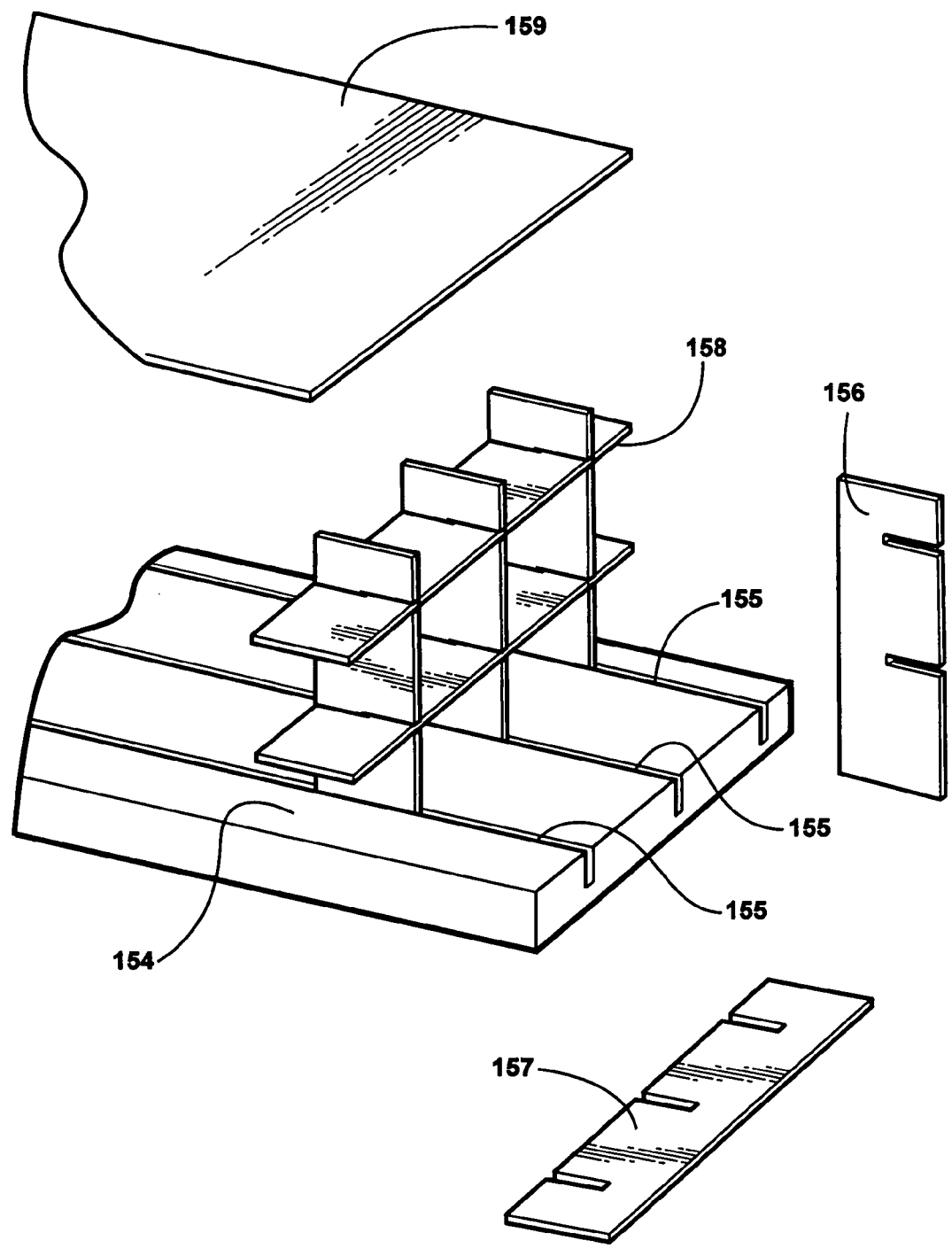
FIG. 13B is an exploded view of yet another alternative embodiment of a welded structure according to the present invention, having channels defined by stiffener elements.

FIG. 13B illustrates a portion of yet another embodiment of the present invention wherein the core is more complex. FIG. 13B shows a fixture 154 with a plurality of slots 155 that are parallel to one another and cut into one face of the fixture. Vertical stiffeners 156 and horizontal stiffeners 157 are illustrated and may be assembled so as to provide the grid shown at 158. In the illustrated embodiment, three vertical stiffeners are interconnected with two horizontal stiffeners. In one preferred arrangement, a plurality of these grids 158 are positioned side by side so as to provide a plurality of parallel channels. In this example, twelve channels would be provided in a grid that is three high by four wide. The grids 158 may or may not be interconnected, depending on the application. A face sheet 159 is then placed on top of the plurality of grids 158 such that it is generally parallel to the fixture 154. The face sheet 159 is then welded to the upper edges of the vertical stiffeners 156. This may be a one-step process or a two-step process in which spot welds are followed by continuous welds. The grids and face sheet may then be removed from the fixture and turned over, and a second face sheet may be attached to the other ends of the vertical stiffeners 156. Side sheets may also be attached to the ends of the horizontal members 157. This approach may be beneficial for providing heat exchangers or other devices that require flow-through channels parallel to the face sheets. As will be clear to those of skill in the art, more or fewer channels may be provided, the stiffeners may be larger or smaller, or shaped differently, and non-rectangular configurations may be created.

Figure 1:
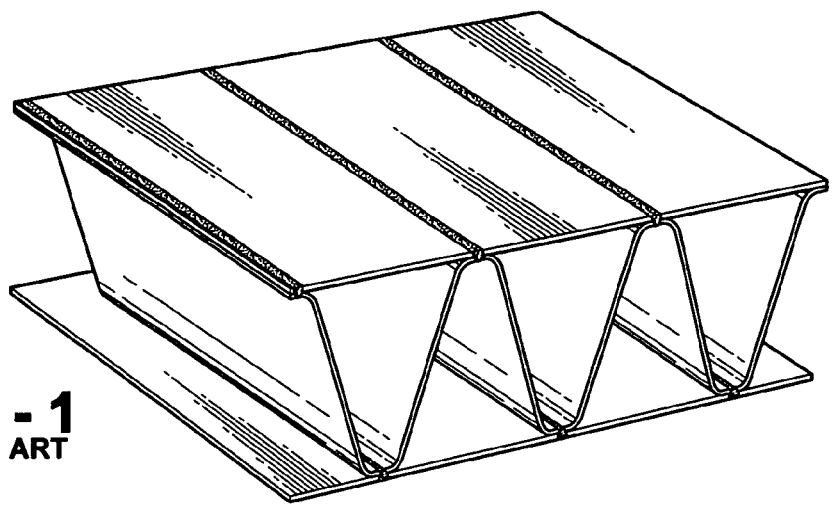
FIG. 1 is a perspective view of a welded panel assembly including a pair of face sheets and a corrugated stiffener core.

We turn now to a discussion of methods of forming welded structures according to the present invention. These methods may be used with a grid of stiffener elements, such as discussed above, as well as other types of stiffener cores, such as the core shown in FIG. 1, with appropriate modifications to accommodate these other cores. According to one embodiment of a method according to the present invention, a stiffener core is provided and a first and second face sheet are disposed on opposite sides of the stiffener core. The face sheets and core are placed in a restraining fixture and restrained in a predetermined shape. Autogenous welding is then performed on both sides of the assembly with the restraining fixture maintaining the assembly in the predetermined shape. Numerous additions and alternatives to this basic method are provided by the present invention. For example, it is preferred that one of the face sheets first be spot welded to a grid of stiffener elements at intervals along stiffener elements in both directions. The second face sheet is then positioned against the other side of the stiffener core formed by the stiffener elements and spot welded at intervals along the stiffener elements in each direction. If the stiffener core is a corrugated core, such as shown in FIG. 1, the spot welds need to be performed only in one direction along each of the peaks. The spot welded assembly may have utility as is, but preferably is then placed in the restraining fixture and continuous autogenous welds are performed on both sides while the assembly is restrained in the predetermined shape. For the embodiments of the present invention illustrated in all but FIG. 13, the predetermined shape is flat.

Figure 14:
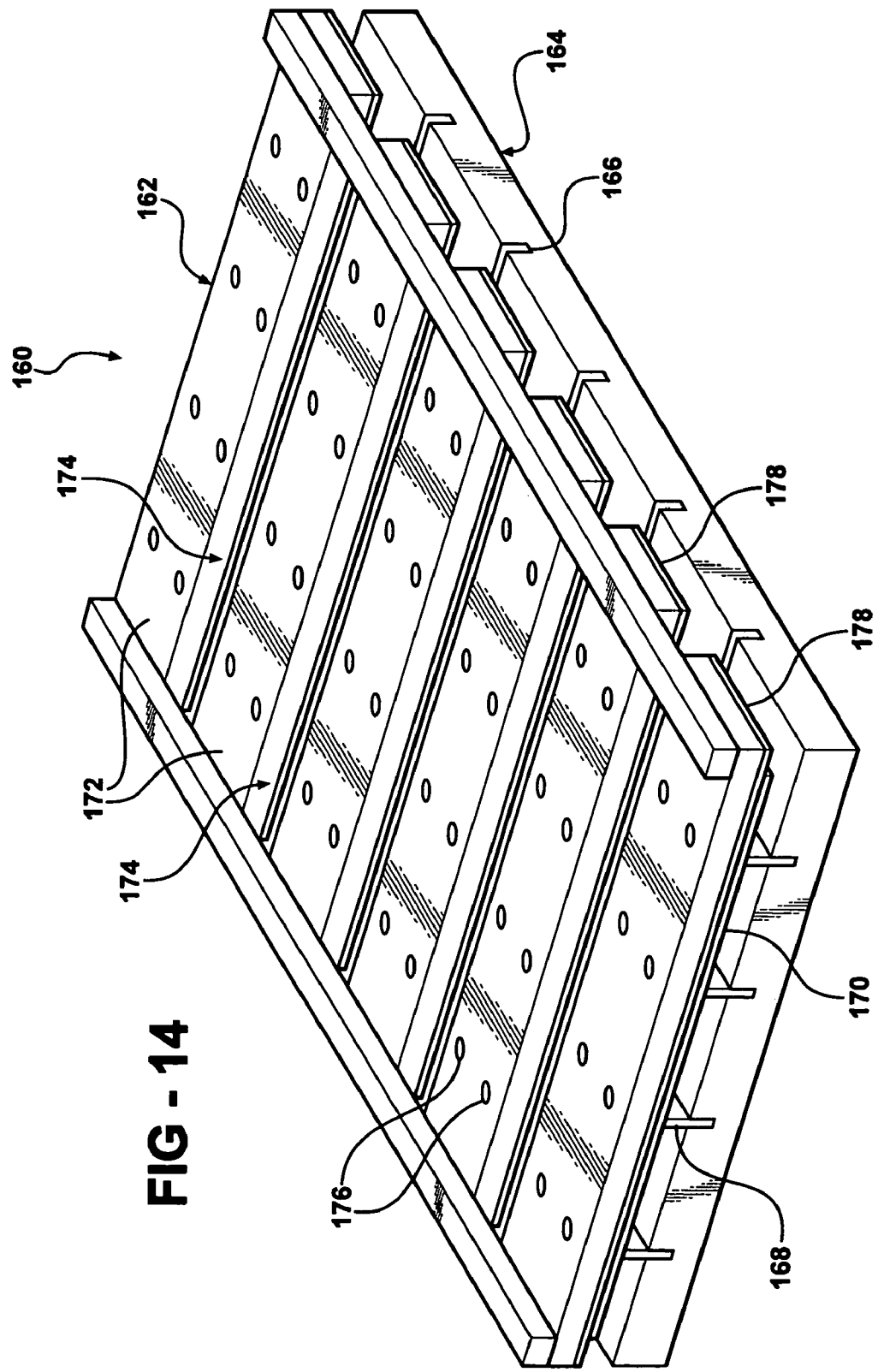
FIG. 14 is a perspective view of an embodiment of a positioning fixture according to the present invention for holding a face sheet against a plurality of stiffener elements for welding thereto.

FIG. 14 illustrates a positioning fixture 160 which may be used as part of the present invention. The positioning fixture of 160 has an upper portion 162 and a lower portion 164. It should be noted that terms such as "upper" and "lower," and other terms of relative position, are used herein merely for convenience and should not be construed as limiting on the orientation or configuration of the present invention. In this version of a positioning fixture, the lower portion 164 has a grid of grooves 166 which receive stiffener elements 168. The stiffener elements are placed in the grooves 166 and a face sheet 170 is positioned against the upper edges of the stiffener elements. The upper portion 162 of the fixture 160 includes a plurality of cross-members 172 that are generally parallel and spaced apart so as to define a plurality of gaps 174 therebetween. Welding may be performed in these gaps 174. The cross-members 172 preferably also include a plurality of openings or holes 176 therethrough for providing spot welds into stiffener elements perpendicular to those aligned with the gaps 174. The upper portion 162 of the fixture 160 may include a compliant layer 178 on the underside of each of the cross-members 172. Though not illustrated, the compliant member would have openings or holes aligned with the openings 176 so as to allow welding therethrough. The compliant layer allows for slight variations in the position of the face sheet so that it can be maintained in constant contact with the stiffener elements during spot welding. In use, the stiffener elements 168 and face sheet 170 are positioned in the positioning fixture and the upper portion 162 is used to press the face sheet 170 against the stiffener elements during the spot welding. In versions of the present invention making use of a self-supporting grid of stiffener elements, the lower portion 164 of the positioning fixture may be a flat plate, since grooves may not be necessary to position and support the stiffener elements.

Following spot welding of the first face sheet to the stiffener elements, the stiffener elements and face sheet are removed from the positioning fixture to allow the second face sheet to be positioned against the opposing edges of the stiffener elements. This may then be pressed against the stiffener elements by the same or a similar positioning fixture for spot welding of the second face sheet to the stiffener elements. It may be possible to skip the step of spot welding the face sheets to the core, and to proceed to continuous welding, as described below. However, spot welding is preferred. It should be noted that spot welding, as used herein, means a localized weld that may be a single spot formed by a stationary welding head or may be a weld formed by pulsing the welding head while it is moving, which may or may not create a "spot-shaped" weld. In each case, the spot welding is preferably formed autogenously.

Figure 15:
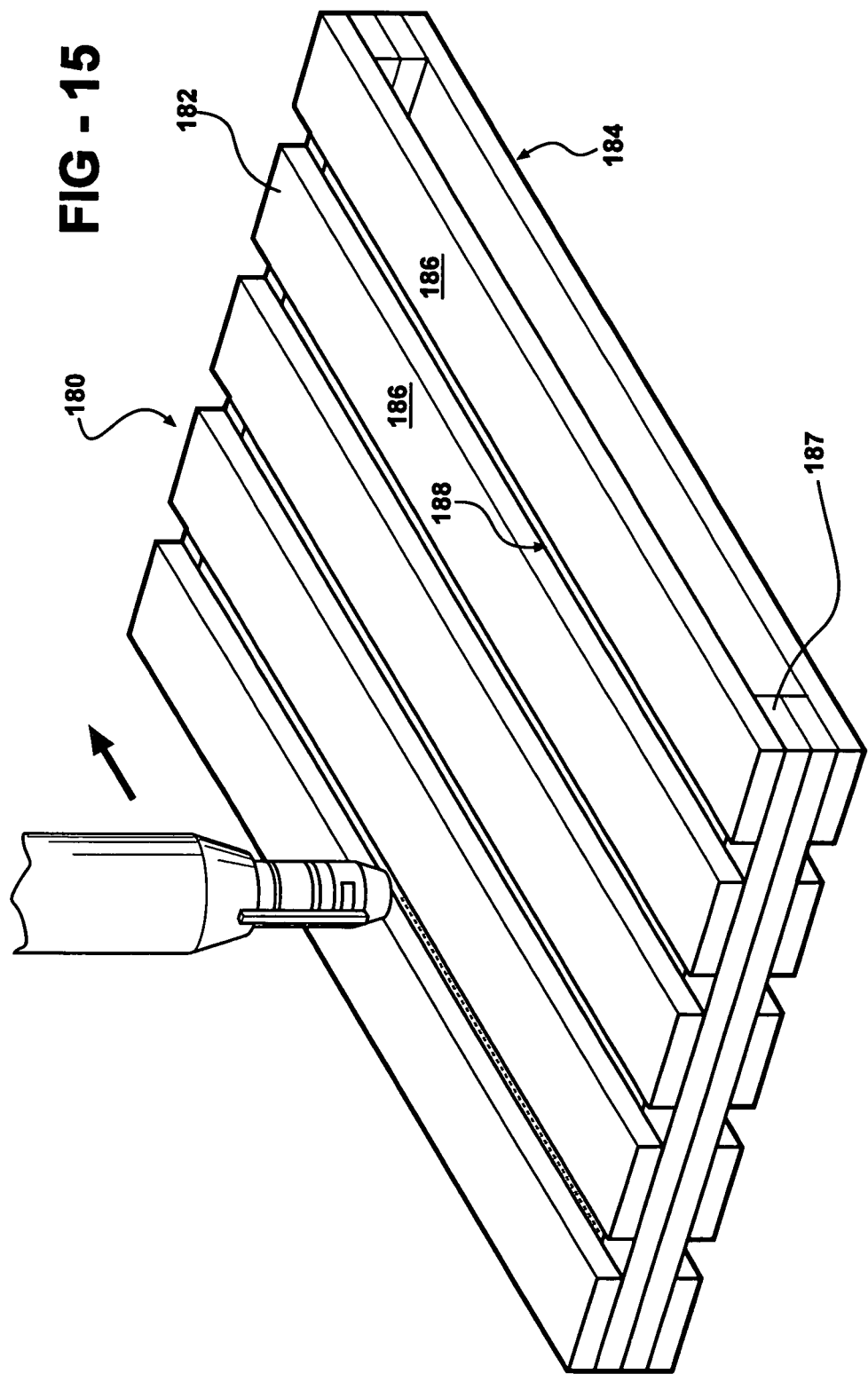
FIG. 15 is a perspective view of an embodiment of a restraining fixture according to the present invention that is used to restrain a pair of face sheets and a stiffener core therebetween in a predetermined shape during continuous autogenous welding on both sides of the assembly.
Figure 16:
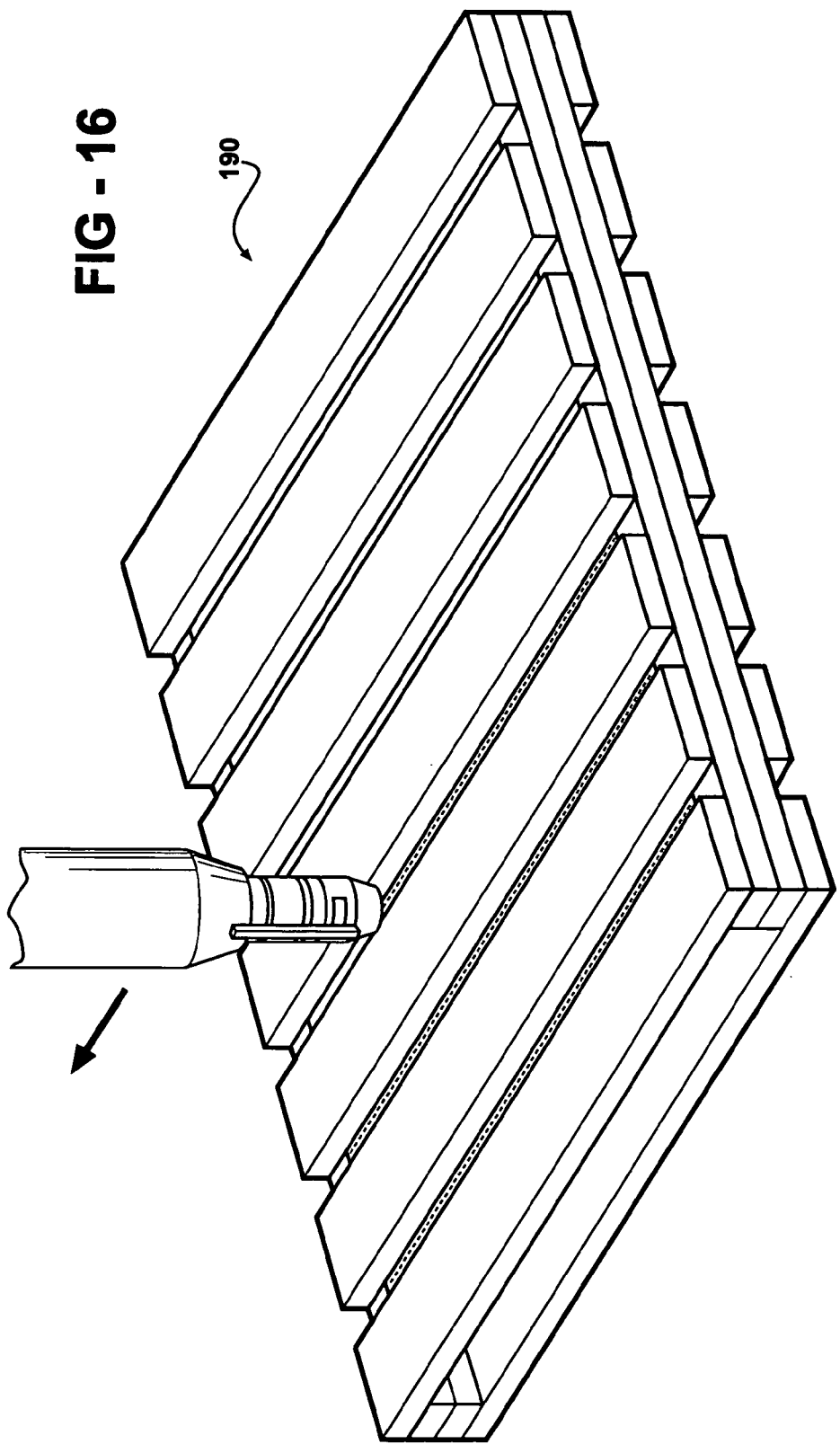
FIG. 16 is a perspective view of another restraining fixture configured to allow continuous autogenous welding in a direction perpendicular to the welds performed in FIG. 15.

FIG. 15 illustrates a restraining fixture 180 having an upper portion 182 and a lower portion 184. Preferably, the upper portion 182 and lower portion 184 are substantially the same, and each include a plurality of cross-members 186 that are generally parallel and spaced apart so as to define a plurality of gaps therebetween and are fastened at their ends to the rails 187. The spot welded assembly of two face sheets and a stiffener core, which lies inside the restraining fixture and cannot be seen in this perspective view, is positioned between the upper portion 182 and lower portion 184 and restrained in a predetermined shape, which is flat in FIG. 15, by attaching the upper portion to the lower portion with fasteners or other retainers (not shown in FIG. 16). Continuous autogenous welds are then performed in the gaps 188 so as to attach each face sheet securely to the stiffener elements running in one direction. By "continuous" it is meant that the weld creates a line that extends some distance. Typically this distance will be the entire length or width of the structure, though the distance may be less. This process may also be referred to as stake welding. Preferably, the autogenous welding is begun near the midline of the panel and additional welds are provided alternating on each side of this midline and working outwards until the outer edge is reached. All welds may be performed on one side, and then the welds may be performed on the other side. However, it is preferred that the panel be restrained in the predetermine shape during the entire process of welding on both sides of the panel in one direction. Welding of the face sheet to stiffener elements on one side creates stresses in the face sheet which distorts the assembly. However, by maintaining the assembly in the predetermined configuration, during welding of both sides, the finished assembly has the desired shape. In addition, each face sheet ends up being prestressed, which is desirable for some applications. As shown in FIG. 15, the continuous welds are parallel welds to the set of stiffener elements running in one direction. The partially welded assembly can then be removed from the restraining fixture 180 and rotated 90 degrees, or placed in a second restraining fixture, such as shown at 190 in FIG. 16. This fixture 190 has a similar configuration, except that the cross-members run in the short direction. If a restraining fixture is made oversized or square panels are formed, a single restraining fixture may be used for welding in both directions.

Figure 17:
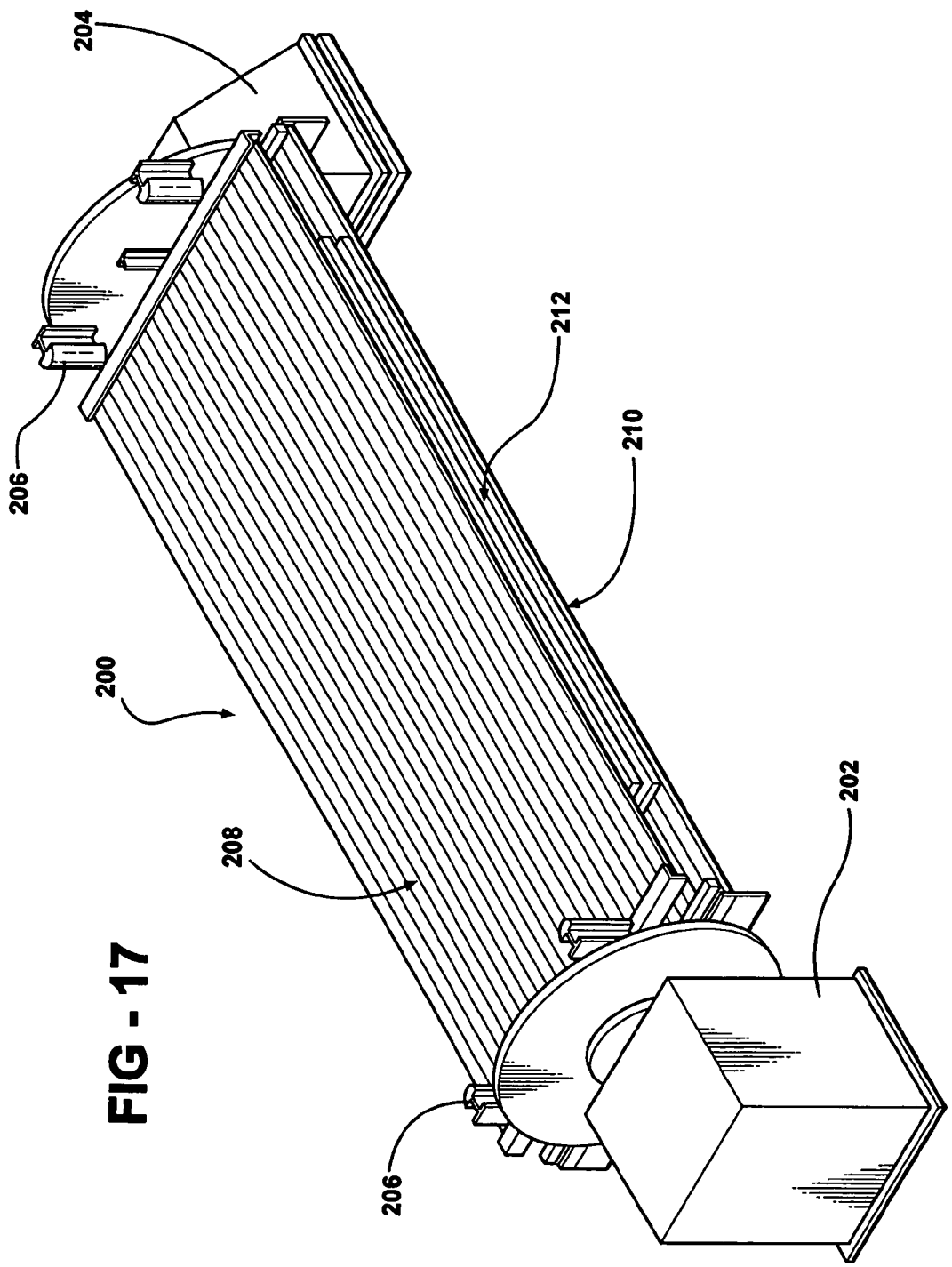
FIG. 17 is a perspective view of another fixture according to the present invention that includes rotary supports for a pair of restraining members.

Referring now to FIG. 17, an alternative retaining fixture is illustrated at 200. The restraining fixture 200 includes a pair of rotary supports 202 and 204 and a plurality of actuators 206 operable to move an upper portion 208 of the restraining fixture relative to a lower portion 210. A panel or structure 212 is shown disposed between the upper portion 208 and lower portion 210. The rotary supports 202 and 204 allow the upper and lower portions 208 and 210 to be rotated side-by-side by 180 degrees or more. As with earlier embodiments, the upper and lower portions of the fixture 200 preferably include a plurality of elongated cross-members that are spaced apart so as to define gaps therebetween for welding of the structure.

Figure 18:
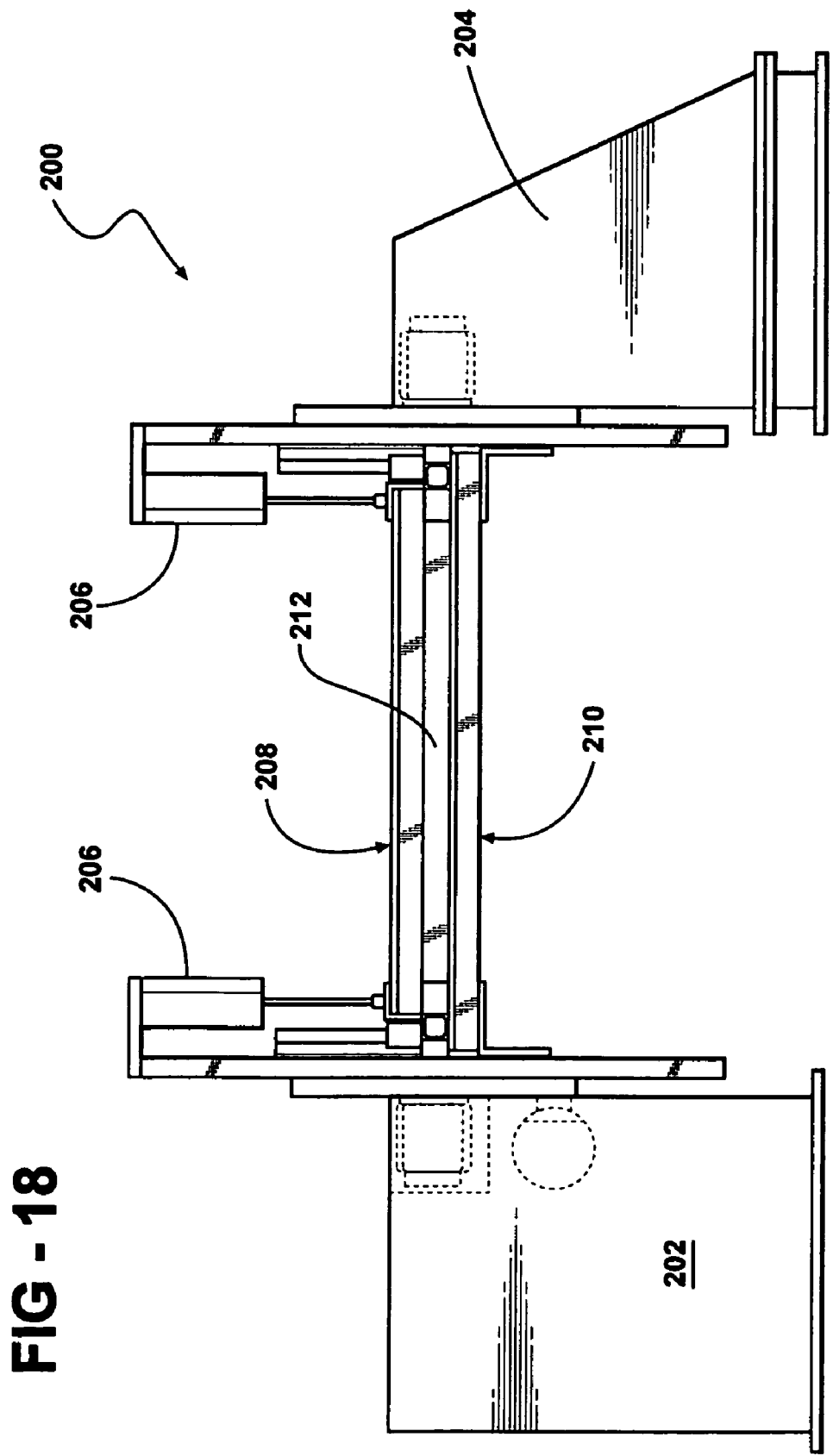
FIG. 18 is a side elevational view of a fixture similar to the one shown in FIG. 17.

FIG. 18 provides an alternative view of a similar restraining fixture, with like element numbers. FIG. 19 provides a cross-sectional view, which illustrates a panel having a corrugated core restrained between the upper portion 208 and lower portion 210. FIG. 20 shows a detailed view of a portion of the panel 212 and a few of the cross-members 214. In this embodiment, the cross-members are T-shaped and have beveled feet 216 with upstanding reinforcement ribs 218. They are spaced apart so as to provide small gaps 220 therebetween for welding the face sheet to the corrugated core. A similar arrangement may be provided for a cellular core, such as discussed earlier. FIG. 20 also illustrates two panels being joined together by a box-like rim member 222, as discussed previously.

While the welded structure according to the present invention has been described as having a stiffener core formed of stiffener elements, this may also be thought of as a spacer core with spacer elements, since the core and elements do not have to provide a stiffening function in all applications. Also, the structure may be formed wherein not all of the stiffener elements or all of the stiffener core is welded to the face sheets, depending on the application. Structures according to the present invention may have a wide variety of metal thicknesses, including face sheets and stiffener elements that all have the same thickness, or that have a variety of different thicknesses, including face sheets with dissimilar thicknesses and stiffener elements that have stiffnesses different than the face sheets and/or that vary from stiffener element to stiffener element. In one version of the present invention, the face sheet and stiffener elements are cut from alloy 304 or 316 stainless steel sheet with thicknesses of 0.036 and 0.120 inches, respectively, using a carbon dioxide laser under CNC automation. As will be clear to those of skill in the art, cutting speed is dependent on the power of the available laser and the sheet thickness. As an example, in our work, stiffener elements are cut from 0.120 inch thick sheets at about 80 inches per minute and about 2000 watts of beam power. Alternatively, the stiffeners could be stamped or formed using other conventional metal forming processes. Stiffener thicknesses comparable to face sheet thicknesses are possible with stiffener elements such as those shown in FIGS. 5 and 6. Also, other metals and metallic alloys and thicknesses could be used. Metallic alloys to which this invention is applicable include but are not limited to low carbon steel and weldable titanium and aluminum alloys. Typical face sheet thicknesses and stiffener heights range from 0.024 to 0.042 inches and 0.875 to 1.500 inches, respectively.

Autogenous welding is preferably performed using laser welding. In one embodiment, the laser weld is approximately 0.035 inches wide where the stiffener edge meets the face sheet and is produced at about 150 inches per minute using an approximately 2000 watt beam power. A helium cover gas may be used.

As will be clear to those of skill in the art, the herein described embodiments of the present invention may be altered in various ways without departing from the scope or teaching of the present invention. As such, the present disclosure should be interpreted broadly. It is the following claims, including all equivalents, which define the scope of the present invention.

We claim:

1. An autogenously welded structure comprising:
    a first face sheet;
    a plurality of individual stiffener elements each having a first edge disposed against the first face sheet and an opposed second edge, each stiffener element having a central portion extending between the opposed edges, the central portion being disposed at an angle to the first face sheet, the stiffener elements including at least some stiffener elements that are disposed at an angle to at least some of the other stiffener elements; and
    a second face sheet disposed against the second edges of the stiffener elements;
    wherein the first and second face sheets are autogenously welded to the edges of the stiffener elements with substantially continuous elongated welds.

2. The structure according to claim 1, wherein the autogenous welding of the face sheets to the edges comprises laser or electron beam autogenous welding.

3. The structure according to claim 1, wherein the central portions of the stiffener elements are disposed generally perpendicular to the face sheets.

4. The structure according to claim 1, wherein the structure is a panel, the face sheets being generally planar and parallel to each other.

5. The structure according to claim 1, wherein at least some of the stiffener elements each further have a first end portion extending from the first edge and a second end portion extending from the second edge, the edge portions each being generally parallel to the face sheets.

6. The structure according to claim 5, wherein the first end portion extends from the first edge in a first direction and the second end portion extends from the second edge in a second direction, the first and second directions being generally opposed.

7. The structure according to claim 1, wherein the stiffener elements each further have an end portion extending from one of the edges, the end portion being folded back on the central portion and generally parallel thereto.

8. The structure according to claim 1, wherein the stiffener elements mechanically interlock such that the stiffener elements form a self-supporting grid.

9. The structure according to claim 1, wherein at least some of the stiffener elements have a hole defined through the central portion.

10. The structure according to claim 1, wherein the stiffener elements are not directly fixedly secured to each other except by the face sheets.

11. The structure according to claim 1, wherein the stiffener elements cooperate to define a plurality of cells.

12. The structure according to claim 11, further comprising a reinforcing member disposed between the face sheets and having opposed faces autogenously welded to the face sheets.

13. The structure according to claim 11, further comprising a reinforcing member autogenously welded to an outer side of one of the face sheets, the reinforcing member having side edges generally disposed in register with stiffener elements defining one or more cells.

14. The structure according to claim 1, wherein the face sheets have a perimeter edge, the structure further comprising a rim member having opposed faces autogenously welded to the face sheets adjacent at least a portion of the perimeter edge.

15. The structure according to claim 1, wherein the face sheets are both generally cylindrical and at least some of the stiffener elements extend radially therebetween.

16. The structure according to claim 1, wherein the stiffener elements include a first set of generally parallel stiffener elements and a second set of generally parallel stiffener elements, the stiffener elements in the second set being disposed at an angle to the stiffener elements in the first set.

17. A method of forming a welded structure comprising:
providing a stiffener core having a first side and a second side, the stiffener core comprising a plurality of individual stiffener elements each having a first edge and an opposed second edge, each stiffener element having a central portion extending between the opposed edges, the stiffener elements including at least some stiffener elements that are disposed at an angle to at least some of the other stiffener elements;
providing a first face sheet and a second face sheet;
providing a restraining fixture, the restraining fixture having an upper portion and a lower portion;
disposing the face sheets and the stiffener core between the upper and lower portions of the restraining fixture such that one face sheet is disposed adjacent the lower portion, the other face sheet is disposed against the upper portion, and the stiffener core is disposed between the face sheets, the first edges of the stiffener elements being disposed against the first face sheet, the second edges of the stiffener elements being disposed against the second face sheet, and the central portions of the stiffener elements being disposed at an angle to the first face sheet;
restraining the face sheets and stiffener core between the upper and lower portions of the restraining fixture such that the face sheets and stiffener core are restrained in a predetermined shape; and
autogenously welding the first face sheet to the stiffener core and the second face sheet to the edges of the stiffener elements with substantially continuous elongated welds while the face sheets and stiffener core are restrained in the predetermined shape;
thereby forming a welded structure of the first and second face sheets with the stiffener core disposed therebetween.

18. The method according to claim 17, further comprising:
spot welding the first face sheet to the stiffener core; and
spot welding the second face sheet to the stiffener core;
thereby forming an assembly of the first and second face sheets with the stiffener core retained therebetween;
wherein the step of disposing the face sheets and stiffener core between the upper and lower portions of the restraining fixture comprises disposing the assembly formed by the spot welding steps between the upper and lower portions of the restraining fixture.

19. The method according to claim 18, further comprising:
providing a positioning fixture having an upper portion and a lower portion, the upper portion having a plurality of cross members, the cross members being spaced apart so as to define a plurality of gaps therebetween;
disposing one side of the stiffener core on the lower portion of the positioning fixture;
disposing the first face sheet on the other side of the stiffener core;
positioning the upper portion of the positioning fixture against the first face sheet; and
then performing the step of spot welding the first face sheet to the stiffener core by spot welding in the gaps between the cross members.

20. The method according to claim 17, wherein the autogenous welding comprises laser or electron beam autogenous welding.

21. The method according to claim 17, wherein:
the restraining fixture providing step comprises providing a restraining fixture having an upper portion and a lower portion each comprising a plurality of spaced apart cross members defining a plurality of gaps therebetween; and
the autogenous welding step comprises forming the welds in the gaps between the cross members.

22. The method according to claim 21, further comprising:
providing a second restraining fixture having an upper portion and a lower portion each comprising a plurality of spaced apart cross members defining a plurality of gaps therebetween;
restraining the welded structure between the upper and lower portions such that the spaced apart upper cross members are disposed against the first face sheet, the spaced apart lower cross members are disposed against the second face sheet, and the assembly is restrained in a predetermined shape, the assembly positioned such that the continuous welds previously formed are disposed at an angle to the upper and lower cross members of the second restraining fixture; and
autogenously welding the first face sheet to the edges of the stiffener elements and the second face sheet to the edges of the stiffener elements with a plurality of continuous welds while the welded structure is restrained in the predetermined shape, the welds being formed in the gaps between the cross members of the second restraining fixture.

23. The method according to claim 22, wherein the first restraining fixture and the second restraining fixture are the same fixture, the method further comprising removing the welded structure from the fixture and rotating the assembly such that the welds already formed are disposed at an angle to the cross members.

24. The method according to claim 21, wherein the restraining fixture further includes a pair of rotary supports supporting the upper and lower portions and an actuator for moving one of the portions relative to the other portion.

* * * * *